(12) United States Patent
Shinohara et al.

(10) Patent No.: US 9,170,403 B2
(45) Date of Patent: Oct. 27, 2015

(54) IMAGING LENS AND IMAGING APPARATUS EQUIPPED WITH THE IMAGING LENS

(71) Applicant: FUJIFILM Corporation, Tokyo (JP)

(72) Inventors: Yoshikazu Shinohara, Saitama-ken (JP); Kazuya Yoneyama, Saitama-ken (JP); Michio Cho, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/547,768

(22) Filed: Nov. 19, 2014

(65) Prior Publication Data
US 2015/0077863 A1   Mar. 19, 2015

Related U.S. Application Data

(63) Continuation of application No. PCT/JP2013/003250, filed on May 22, 2013.

(60) Provisional application No. 61/660,265, filed on Jun. 15, 2012.

(30) Foreign Application Priority Data

May 24, 2012   (JP) .................................. 2012-118548

(51) Int. Cl.
*G02B 3/02*     (2006.01)
*G02B 13/18*    (2006.01)
*G02B 9/60*     (2006.01)
*G02B 13/00*    (2006.01)

(52) U.S. Cl.
CPC .............. *G02B 13/0045* (2013.01); *G02B 9/60* (2013.01); *G02B 13/18* (2013.01); *G02B 13/009* (2013.01)

(58) Field of Classification Search
CPC ............................. G02B 9/60; G02B 13/0045
USPC .................................................. 359/714, 764
See application file for complete search history.

(56) References Cited

U.S. PATENT DOCUMENTS

| 4,738,496 A | 4/1988 | Canzek |
| 5,546,236 A | 8/1996 | Ogata et al. |
| 5,745,301 A | 4/1998 | Betensky et al. |

(Continued)

FOREIGN PATENT DOCUMENTS

| JP | 53-46729 | 4/1978 |
| JP | 61-188510 | 8/1986 |

(Continued)

OTHER PUBLICATIONS

International Search Report, PCT/JP2013/003250, Aug. 13, 2013.

*Primary Examiner* — William Choi
(74) *Attorney, Agent, or Firm* — Young & Thompson

(57) ABSTRACT

An imaging lens is constituted by: a first lens having a positive refractive power and is of a meniscus shape with a convex surface toward the object side; a second lens having a negative refractive power; a third lens having a positive refractive power and a convex surface toward the object side; a fourth lens having a positive refractive power and a convex surface toward the object side; and a fifth lens having a negative refractive power, a concave surface toward the image side on the surface thereof toward the image side in the vicinity of the optical axis, and an inflection point on the surface thereof toward the image side, provided in this order from the object side.

20 Claims, 23 Drawing Sheets

(56) References Cited

U.S. PATENT DOCUMENTS

| | | |
|---|---|---|
| 8,390,940 B2 | 3/2013 | Tsai et al. |
| 8,390,941 B2 | 3/2013 | Shinohara |
| 2011/0134305 A1 | 6/2011 | Sano et al. |
| 2011/0249348 A1* | 10/2011 | Kubota et al. ............... 359/764 |

FOREIGN PATENT DOCUMENTS

| | | |
|---|---|---|
| JP | 61-219015 | 9/1986 |
| JP | 02-167516 | 6/1990 |
| JP | 03-172813 | 7/1991 |
| JP | 05-264900 | 10/1993 |
| JP | 07-35973 | 2/1995 |
| JP | 07-120671 | 5/1995 |
| JP | 10-513270 | 12/1998 |
| JP | 2010-262269 | 11/2010 |
| JP | 2010-262270 | 11/2010 |
| JP | 2011-209554 | 10/2011 |
| JP | 2012-145839 | 8/2012 |
| WO | WO2010/024198 | 3/2010 |

* cited by examiner

EXAMPLE 1

EXAMPLE 4

EXAMPLE 1

EXAMPLE 11

IMAGING LENS AND IMAGING APPARATUS EQUIPPED WITH THE IMAGING LENS

CROSS REFERENCE TO RELATED APPLICATIONS

This application is a Continuation of PCT International Application No. PCT/JP2013/003250 filed on May 22, 2013, which claims priority under 35 U.S.C. §119(a) to Japanese Patent Application No. 2012-118548 filed on May 24, 2012 and U.S. Provisional Patent Application No. 61/660,265 filed on Jun. 15, 2012. Each of the above application(s) is hereby expressly incorporated by reference, in its entirety, into the present application.

BACKGROUND OF THE INVENTION

1. Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

2. Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, the present applicant has proposed imaging lenses having five lens configurations, constituted by: a first lens having a positive refractive power, a second lens having a negative refractive power, a third lens having a positive refractive power, a fourth lens having a positive refractive power, and a fifth lens having a negative refractive power, provided in this order from the object side (refer to Japanese Unexamined Patent Publication Nos. 2010-262269, 2010-262270, and 2011-209554).

DISCLOSURE OF THE INVENTION

Meanwhile, there is increasing demand for imaging lenses for use in apparatuses which are becoming thinner such as smart phones and tablet terminals to have shorter total lengths. For this reason, it is preferable to realize an image size which is sufficiently large to be compatible with the sizes of imaging elements capable of obtaining sufficiently high resolution, while further shortening the total length of a lens. It is preferable for the imaging lenses disclosed in Japanese Unexamined Patent Publication Nos. 2010-262269, 2010-262270, and 2011-209554 to achieve further shortening of the total lengths thereof.

The present invention has been developed in view of the foregoing points. The object of the present invention is to provide an imaging lens that can realize a shortened total length and high imaging performance from a central angle of view to peripheral angles of view. It is another object of the present invention to provide an imaging apparatus equipped with the imaging lens, which is capable of obtaining high resolution photographed images.

A first imaging lens of the present invention substantially consists of five lenses, including:

a first lens having a positive refractive power and is of a meniscus shape with a convex surface toward the object side;

a second lens having a negative refractive power;

a third lens having a positive refractive power and a convex surface toward the object side;

a fourth lens having a positive refractive power and a convex surface toward the object side; and a fifth lens having a negative refractive power, a concave surface toward the image side on the surface thereof toward the image side in the vicinity of the optical axis, and an inflection point on the surface thereof toward the image side, provided in this order from the object side;

the imaging lens satisfying the following conditional formula:

$$0.34 < f/f12 < 0.6 \tag{8-2}$$

wherein f is the focal length of the entire system, and f12 is the combined focal length of the first lens and the second lens.

A second imaging lens of the present invention substantially consists of five lenses, including:

a first lens having a positive refractive power and is of a meniscus shape with a convex surface toward the object side;

a second lens having a negative refractive power;

a third lens having a biconvex shape;

a fourth lens having a positive refractive power and a convex surface toward the object side; and a fifth lens having a negative refractive power and concave surface toward the image side on the surface thereof toward the image side in the vicinity of the optical axis, the surface toward the image side being of an aspherical shape having an inflection point, provided in this order from the object side;

the imaging lens satisfying the following conditional formula:

$$-0.8 < f/f2 < -0.1 \tag{1}$$

wherein f is the focal length of the entire system, and f2 is the combined focal length of the second lens.

Note that in the first and second imaging lenses of the present invention, the expression "substantially consists of five lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the five lenses.

The optical performance of the first and second imaging lenses of the present invention can be further improved by adopting the following favorable configurations.

In the imaging lens of the first and second imaging lenses of the present invention, it is preferable for an aperture stop to be positioned at the object side of the surface of the second lens toward the object side.

It is preferable for the first imaging lens of the present invention to satisfy any one of Conditional Formulae (1) through (7-2) and Conditional Formulae (8-3) through (9-1) below. Note that in a preferred aspect of the present invention, the first imaging lens may satisfy any one or arbitrary combinations of Conditional Formulae (1) through (7-2) and Conditional Formulae (8-3) through (9-1). It is preferable for the second imaging lens of the present invention to satisfy any one of Conditional Formulae (2) through (8-1) and Conditional Formulae (9) and (9-1) below. Note that in a preferred aspect of the present invention, the first imaging lens may satisfy anyone or arbitrary combinations of Conditional Formulae (2) through (8-1) and Conditional Formulae (9) and (9-1).

$$-0.8 < f/f2 < -0.1 \quad (1)$$

$$0.3 < f/f1 < 1.4 \quad (2)$$

$$-1 < (R1f - R1r)/(R1f + R1r) < -0.15 \quad (3)$$

$$0 < f/f3 < 1 \quad (4)$$

$$0.8 < f/f4 < 2.4 \quad (5\text{-}2)$$

$$-5 < f/f5 < 0 \quad (6)$$

$$0.8 < f/f34 < 2.5 \quad (7)$$

$$0.86 < f/f34 < 2.4 \quad (7\text{-}1)$$

$$0.9 < f/f34 < 2.2 \quad (7\text{-}2)$$

$$0.25 < f/f12 < 0.6 \quad (8)$$

$$0.25 < f/f12 < 0.56 \quad (8\text{-}1)$$

$$0.34 f/f12 < 0.56 \quad (8\text{-}3)$$

$$0.1 < D9/f < 0.5 \quad (9)$$

$$0.12 < D9/f < 0.3 \quad (9\text{-}1)$$

wherein f is the focal distance of the entire system, f1 is the focal length of the first lens, f2 is the focal length of the second lens, f3 is the focal length of the third lens, f4 is the focal length of the fourth lens, f5 is the focal length of the fifth lens, f12 is the combined focal length of the first lens and the second lens, f34 is the combined focal length of the third lens and the fourth lens, D9 is the distance between the fourth lens and the fifth lens along the optical axis, R1f is the paraxial radius of curvature of the surface of the first lens toward the object side, and R1r is the paraxial radius of curvature of the surface of the first lens toward the image side.

An imaging apparatus of the present invention is equipped with the first or the second imaging lens of the present invention.

According to the first and second imaging lenses of the present invention, the configuration of each lens element is optimized within a lens configuration having five lenses as a whole. Particularly, the shapes of the first lens, the third lens, the fourth lens, and the fifth lens are favorably configured. Therefore, a lens system that can achieve a short total length, which has high imaging performance from a central angle of view to peripheral angles of view, can be realized.

In addition, the imaging apparatus of the present invention outputs image signals corresponding to optical images formed by the first or second imaging lens of the present invention. Therefore, the imaging apparatus of the present invention is capable of obtaining high resolution photographed images.

EMBODIMENTS OF THE INVENTION

Hereinafter, embodiments of the present invention will be described in detail with reference to the attached drawings.

Figure 1:
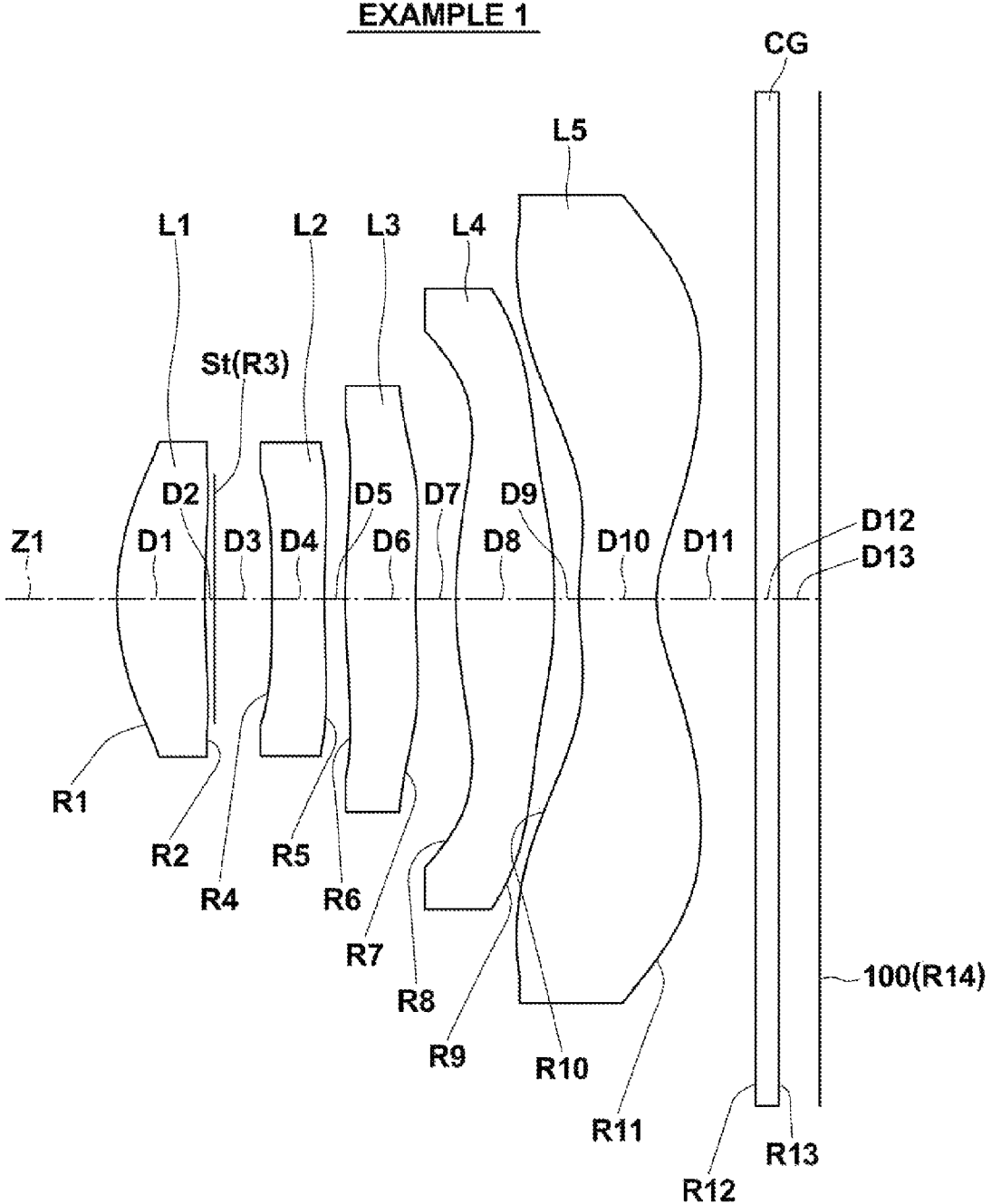
FIG. 1 is a sectional diagram that illustrates a first example of the configuration of an imaging lens according to an embodiment of the present invention, and corresponds to a lens of Example 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 6, FIG. 9, and FIG. 11 are sectional diagrams that illustrate second through sixth, ninth and eleventh examples of lens configurations that correspond to Numerical Examples 2 through 6, 9, and 11 (Tables 3 through 12, Tables 17 through 18, and Tables 21 through 22) to be described later. In FIG. 1 through FIG. 6, FIG. 9, and FIG. 11, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIG. 2 through FIG. 6, FIG. 9, and FIG. 11 will also be described as necessary.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, along the optical axis Z1 in this order from the object side.

Figure 23:
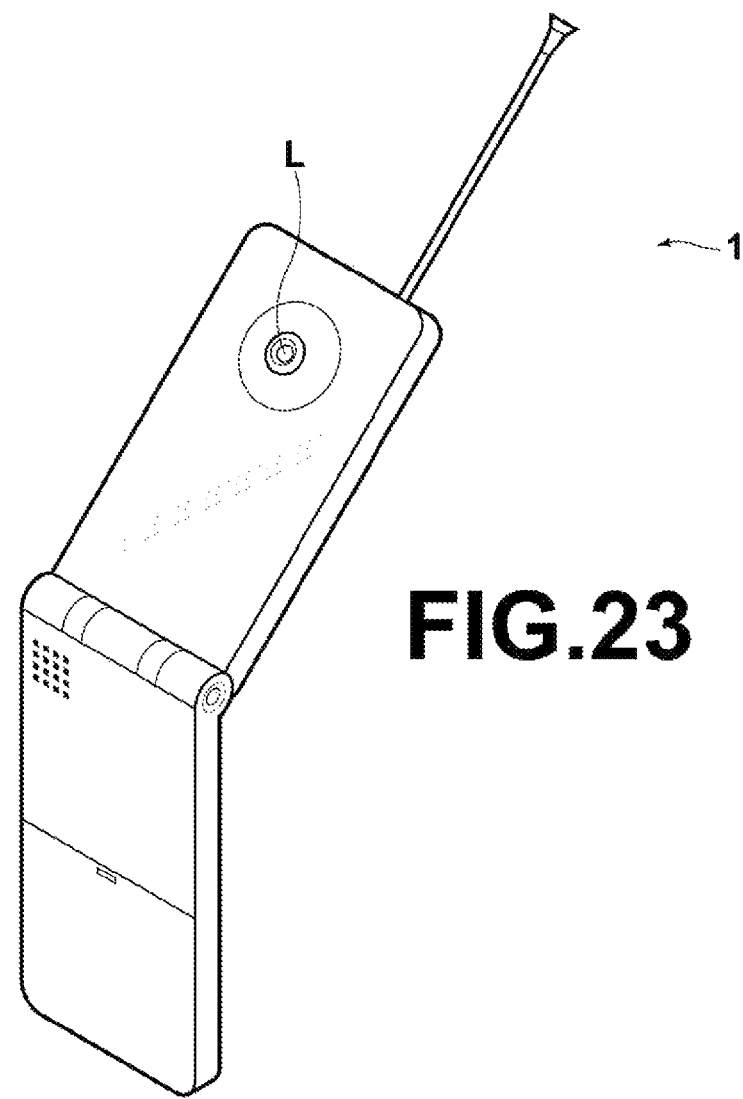
FIG. 23 is a diagram that illustrates a cellular telephone as an imaging apparatus equipped with the imaging lens of the present invention.

FIG. 23 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging plane) of the imaging lens L.

Figure 24:
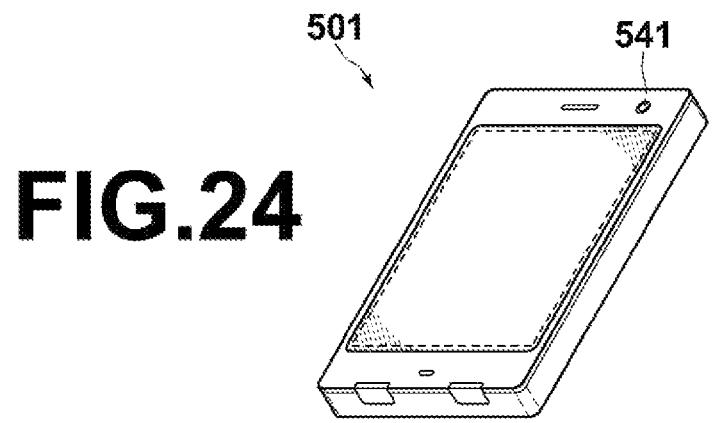
FIG. 24 is a diagram that illustrates a smart phone as an imaging apparatus equipped with the imaging lens of the present invention.

FIG. 24 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging plane) of the imaging lens L.

Various optical members CG may be provided between the fifth lens L5 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the fifth lens L5 to obtain the same effect as that of the optical member CG. In this case, the number of parts can be reduced, and the total length can be shortened.

The imaging lens L is equipped with an aperture stop St positioned at the object side of the surface of the second lens L2 toward the object side. By positioning the aperture stop St at the object side of the surface of the second lens L2 toward the object side, increases in the incident angles of light rays at peripheral angles of view that enter the image formation plane (imaging element) can be suppressed. It is preferable for the apertures stop St to be positioned at the object side of the surface of the first lens L1 toward the object side, in order to cause this advantageous effect to become more prominent. Note that the expression "positioned at the object side of the surface of the second lens toward the object side" means that the position of the aperture stop in the direction of the optical axis is at the same position as the intersection of marginal axial rays of light and the surface of the second lens L2 toward the object side, or more toward the object side than this position. Similarly, the expression "positioned at the object side of the surface of the first lens toward the object side" means that the position of the aperture stop in the direction of the optical axis is at the same position as the intersection of marginal axial rays of light and the surface of the first lens L1 toward the object side, or more toward the object side than this position.

In the case that the aperture stop St is positioned at the object side of the surface of the first lens L1 toward the object side, it is preferable for the aperture stop St to be positioned at the image side of the apex of the surface of the first lens L1, as in the lenses of Examples 3 and 11 to be described later (refer to FIGS. 3 and 11). In the case that the aperture stop St is positioned at the image side of the apex of the surface of the first lens L1 in this manner, the total length of the imaging lens including the aperture stop St can be shortened. However, the present invention is not limited to such a configuration, and the aperture stop St may be positioned at the object side of the apex of the surface of the first lens L1. A case in which the aperture stop St is positioned at the object side of the apex of the surface of the first lens L1 is somewhat disadvantageous from the viewpoint of securing peripheral light compared to a case in which the aperture stop St is positioned at the image side of the apex of the surface of the first lens L1. However, increases in the incident angles of light rays at peripheral angles of view that enter the image formation plane (imaging element) can be more favorably suppressed.

In addition, as shown in Examples 1, 2, 4, 5, 6, and 9 (refer to FIGS. 1, 2, 4, 5, 6, and 9), the aperture stop St may be provided between the first lens L1 and the second lens L2 in the direction of the optical axis. In this case, field curvature can be favorably corrected. Note that telecentric properties are secured more than in the case that the aperture stop St is positioned at the object side of the surface of the first lens L1 toward the object side in the direction of the optical axis. That is, although such a configuration is disadvantageous from the viewpoint of maintaining principal rays of light to be as parallel to the optical axis as possible (causing incident angles at the imaging plane to approach zero), favorable optical performance can be realized, by utilizing imaging elements that have been realized recently accompanying developments in imaging element technology, in which deterioration of light receiving efficiency and the occurrence of color mixing have been reduced.

In the imaging lens L, the first lens L1 has a positive refractive power in the vicinity of the optical axis. The first lens L1 is of a meniscus shape having a convex surface toward the object side in the vicinity of the optical axis. By the first lens L1 being of a meniscus shape having a convex surface toward the object side in this manner, the position of the rearward principal point of the first lens L1 can be closer to the object side and the total length can be favorably shortened.

The second lens L2 has a negative refractive power in the vicinity of the optical axis. By the second lens L2 having a negative refractive power in the vicinity of the optical axis, spherical aberration, field curvature, and longitudinal chromatic aberration can be favorably corrected. In addition, it is preferable for the second lens L2 to be of a biconcave shape in the vicinity of the optical axis, as shown in Example 1. In the case that the second lens L2 is of a biconcave shape in the vicinity of the optical axis, spherical aberration can be favorably corrected.

The third lens L3 has a positive refractive power in the vicinity of the optical axis. Further, the third lens L3 has a convex surface toward the object side in the vicinity of the optical axis. By the third lens L3 having a convex surface toward the object side in the vicinity of the optical axis, the position of the rearward principal point of the third lens L3 can be closer to the object side and the total length can be favorably shortened, compared to a case in which the third lens L3 has a concave surface toward the object side in the vicinity of the optical axis. It is more preferable for the third lens L3 to be of a meniscus shape having a convex surface toward the object side as shown in Examples 1, 3, 5, and 11, in order to cause this advantageous effect to become more prominent. Alternatively, it is preferable for the third lens L3 to be of a biconvex shape in the vicinity of the optical axis, as shown in Example 2, 4, 6, and 9. In the case that the third lens L3 is of a biconvex shape in the vicinity of the optical axis, spherical aberration can be favorably corrected.

The fourth lens L4 has a positive refractive power in the vicinity of the optical axis. Further, the fourth lens L4 has a convex surface toward the object side in the vicinity of the optical axis. By the fourth lens L4 having a convex surface toward the object side in the vicinity of the optical axis, the position of the rearward principal point of the fourth lens L4 can be closer to the object side and the total length can be favorably shortened, compared to a case in which the fourth lens L4 has a concave surface toward the object side in the vicinity of the optical axis. It is preferable for the fourth lens L4 to be of a biconvex shape in the vicinity of the optical axis as shown in Example 1. In this case, the distance between the fourth lens L4 and the fifth lens L5 along the optical axis can be shortened, and therefore the total length can be more favorably shortened.

The fifth lens L5 has a negative refractive power in the vicinity of the optical axis. If the first lens L1 through the fourth lens L4 is considered to be a single positive lens group, the imaging lens L can be of a telephoto type configuration as a whole by the fifth lens L5 having a negative refractive power. Therefore, the rearward principal point of the imaging lens as a whole can be more toward the object side, and the total length can be favorably shortened. Further, it is more preferable for the fifth lens L5 to be of a meniscus shape having a concave surface toward the image side as shown in Example 1. In this case, the total length can be more favorably shortened. In addition, field curvature can be favorably corrected by the fifth lens L5 having a negative refractive power.

In addition, the surface of the fifth lens L5 toward the image side is concave toward the image side in the vicinity of the optical axis, and is of an aspherical shape having an inflection point. The total length can be favorably shortened by the surface of the fifth lens L5 toward the image side being concave toward the image side in the vicinity of the optical axis. In addition, distortion can be favorably corrected by the surface of the fifth lens L5 toward the image side being of an aspherical shape with an inflection point.

It is preferable for at least one of the surfaces of each of the first lens L1 through the fifth lens L5 of the imaging L to be an aspherical surface, in order to improve performance.

In addition, it is preferable for each of the lenses L1 through L5 that constitute the imaging lens L to be a single lens, not a cemented lens. By employing single lenses for all of the lenses, the number of aspherical surfaces will be greater than a case in which any of the lenses are cemented lenses. Therefore, the degree of freedom in the design of each lens will increase, and the total length can be favorably shortened.

Next, the operation and effects of conditional formulae related to the imaging lens L will be described in greater detail.

First, it is preferable for the focal length f2 of the second lens L2 and the focal length f of the entire system to satisfy Conditional Formula (1) below.

$$-0.8 < f/f2 < -0.1 \qquad (1)$$

Conditional Formula (1) defines a preferable range of numerical values for the ratio of the focal length f of the entire system with respect to the focal length f2 of the second lens L2. By maintaining the focal length f2 of the second lens L2 with respect to the focal length f of the entire system such that the value of f/f2 is not less than or equal to the lower limit defined in Conditional Formula (1), the negative refractive power of the second lens L2 with respect to the refractive power of the entire system will not become excessively strong, and shortening of the total length can be favorably realized. In addition, by securing the focal length f2 of the second lens L2 with respect to the focal length f of the entire system such that the value of f/f2 is not greater than or equal to the upper limit defined in Conditional Formula (1), the negative refractive power of the second lens L2 with respect to the refractive power of the entire system will not become excessively weak, and longitudinal chromatic aberration can be favorably corrected. From the above viewpoint, it is more preferable for Conditional Formula (1-1) below to be satisfied, and even more preferable for Conditional Formula (1-2) to be satisfied.

$$-0.65<f/f2<-0.25 \quad (1-1)$$

$$-0.6<f/f1<-0.3 \quad (1-2)$$

In addition, it is preferable for the focal length f1 of the first lens L1 and the focal length f of the entire system to satisfy Conditional Formula (2) below.

$$0.3<f/f1<1.4 \quad (2)$$

Conditional Formula (2) defines a preferable range of numerical values for the ratio of the focal length f of the entire system with respect to the focal length f1 of the first lens L1. By securing the focal length f1 of the first lens L1 with respect to the focal length f of the entire system such that the value of f/f1 is not less than or equal to the lower limit defined in Conditional Formula (2), the refractive power of the first lens L1 with respect to the refractive power of the entire system will not become excessively weak, and shortening of the total length can be favorably realized. In addition, by maintaining the focal length f1 of the first lens L1 with respect to the focal length f of the entire system such that the value of f/f1 is not greater than or equal to the upper limit defined in Conditional Formula (2), the refractive power of the first lens L1 with respect to the refractive power of the entire system will not become excessively strong, and spherical aberration and astigmatism can be favorably corrected. From the above viewpoint, it is more preferable for Conditional Formula (2-1) below to be satisfied, and even more preferable for Conditional Formula (2-2) to be satisfied.

$$0.45<f/f1<1.25 \quad (2-1)$$

$$0.5<f/f1<1.2 \quad (2-2)$$

In addition, it is preferable for the paraxial radius of curvature R1f of the surface of the first lens L1 toward the object side and the paraxial radius of curvature R1r of the surface of the first lens L1 toward the image side to satisfy Conditional Formula (3) below.

$$-1<(R1f-R1r)/(R1f+R1r)<-0.15 \quad (3)$$

Conditional Formula (3) defines a preferable range of numerical values of the paraxial radius of curvature R1f of the surface of the first lens L1 toward the object side and the paraxial radius of curvature R1r of the surface of the first lens L1 toward the image side. By setting the paraxial radius of curvature R1f of the surface of the first lens L1 toward the object side and the paraxial radius of curvature R1r of the surface of the first lens L1 toward the image side such that the value of (R1f−R1r)/(R1f+R1r) is not less than or equal to the lower limit defined in Conditional Formula (1), shortening the total length can be favorably realized. In addition, By setting the paraxial radius of curvature R1f of the surface of the first lens L1 toward the object side and the paraxial radius of curvature R1r of the surface of the first lens L1 toward the image side such that the value of (R1f−R1r)/(R1f+R1r) is not greater than or equal to the upper limit defined in Conditional Formula (1), spherical aberration and astigmatism can be favorably corrected. From this viewpoint, it is more preferable for Conditional Formula (3-1) below to be satisfied. Note that in the lens data shown in Tables 1 through 22 to be described later, R2 corresponds to R1f and R3 corresponds to R1r in the examples in which the aperture stop St is positioned at the object side of the surface of the first lens L1 toward the object side. In addition, R1 corresponds to R1f and R2 corresponds to R1r in the examples in which the aperture stop St is provided between the first lens L1 and the second lens L2.

$$-0.8<(R1f-R1r)/(R1f+R1r)<-0.2 \quad (3-1)$$

In addition, it is preferable for the focal length f3 of the third lens L3 and the focal length f of the entire system to satisfy Conditional Formula (4) below.

$$0<f/f3<1 \quad (4)$$

Conditional Formula (4) defines a preferable range of numerical values for the ratio of the focal length f of the entire system with respect to the focal length f3 of the third lens L3. By securing the focal length f3 of the third lens L3 such that the value of f/f3 is not less than or equal to the lower limit defined in Conditional Formula (4), spherical aberration can be favorably corrected. In addition, by maintaining the focal length f3 of the third lens L3 such that the value of f/f3 is not greater than or equal to the upper limit defined in Conditional Formula (4), shortening of the total length can be favorably realized. From the above viewpoint, it is more preferable for Conditional Formula (4-1) below to be satisfied.

$$0<f/f3<0.85 \quad (4-1)$$

In addition, the focal length f4 of the fourth lens L4 and the focal length f of the entire system satisfy Conditional Formula (5) below.

$$0<f/f4<3 \quad (5)$$

Conditional Formula (5) defines a preferable range of numerical values for the focal length f of the entire system with respect to the focal length f4 of the fourth lens L4. By securing the focal length f4 of the fourth lens L4 with respect to the focal length f of the entire system such that the value of f/f4 is not less than or equal to the lower limit defined in Conditional Formula (5), the refractive power of the fourth lens L4 with respect to the refractive power of the entire system will not become excessively weak, and shortening of the total length can be favorably realized. In addition, by maintaining the focal length f4 of the fourth lens L4 with respect to the focal length f of the entire system such that the value of f/f4 is not greater than or equal to the upper limit defined in Conditional Formula (5), the refractive power of the fourth lens L4 with respect to the refractive power of the entire system will not become excessively strong, and lateral chromatic aberration can be favorably corrected. From the above viewpoint, it is more preferable for Conditional Formula (5-1) below to be satisfied, and even more preferable for Conditional Formula (5-2) to be satisfied.

$$0.2<f/f4<2.5 \quad (5-1)$$

$$0.8<f/f4<2.4 \quad (5-2)$$

In addition, the focal length f5 of the fifth lens L5 and the focal length f of the entire system satisfy Conditional Formula (6) below.

$$-5<f/f5<0 \quad (6)$$

Conditional Formula (6) defines a preferable range of numerical values for the focal length f of the entire system with respect to the focal length f5 of the fifth lens L5. By maintaining the focal length f5 of the fifth lens L5 with respect to the focal length f of the entire system such that the value of f/f5 is not less than or equal to the lower limit defined in Conditional Formula (6), the negative refractive power of the fifth lens L5 with respect to the refractive power of the entire system will not become excessively strong, and shortening of the total length can be favorably realized. In addition, by securing the focal length f5 of the fifth lens L5 with respect to the focal length f of the entire system such that the value of f/f5 is not greater than or equal to the upper limit defined in Conditional Formula (6), the negative refractive power of the fifth lens L5 with respect to the refractive power of the entire system will not become excessively weak. As a result, increases in the incident angles of rays of light that enter the image formation plane can be favorably suppressed, particularly at the peripheral portions, and increased generation of various problems caused by increases in incident angles, such as deterioration of light receiving efficiency and color mixing, can be suppressed. From the above viewpoint, it is more preferable for Conditional Formula (6-1) below to be satisfied.

$$-3 < f/f5 < -0.1 \tag{6-1}$$

In addition, it is preferable for the combined focal length f34 of the third lens L3 and the fourth lens L4 and the focal length f of the entire system to satisfy Conditional Formula (7) below.

$$0.8 < f/f34 < 2.5 \tag{7}$$

Conditional Formula (7) defines a preferable range of numerical values for the ratio of the focal length f of the entire system with respect to the combined focal length f34 of the third lens L3 and the fourth lens L4. By securing the combined focal length f34 of the third lens L3 and the fourth lens L4 with respect to the focal length f of the entire system such that the value of f/f34 is not less than or equal to the lower limit defined in Conditional Formula (7), the combined refractive power of the third lens L3 and the fourth lens L4 with respect to the refractive power of the entire system will not become excessively weak, and a shortening of the total length can be favorably realized. In addition, by maintaining the combined focal length f34 of the third lens L3 and the fourth lens L4 with respect to the focal length f of the entire system such that the value of f/f34 is not greater than or equal to the upper limit defined in Conditional Formula (7), the combined refractive power of the third lens L3 and the fourth lens L4 with respect to the refractive power of the entire system will not become excessively strong, and spherical aberration can be favorably corrected. From the above viewpoint, it is more preferable for Conditional Formula (7-1) below to be satisfied, and even more preferable for Conditional Formula (7-2) below to be satisfied.

$$0.86 < f/f34 < 2.4 \tag{7-1}$$

$$0.9 < f/f34 < 2.2 \tag{7-2}$$

In addition, it is preferable for the combined focal length f12 of the first lens L1 and the second lens L2 and the focal length f of the entire system to satisfy Conditional Formula (8) below.

$$0.25 < f/f12 < 0.6 \tag{8}$$

Conditional Formula (8) defines a preferable range of numerical values for the ratio of the focal length f of the entire system with respect to the combined focal length f12 of the first lens L1 and the second lens L2. By securing the combined focal length f12 of the first lens L1 and the second lens L2 with respect to the focal length f of the entire system such that the value of f/f12 is not less than or equal to the lower limit defined in Conditional Formula (8), the combined refractive power of the first lens L1 and the second lens L2 with respect to the refractive power of the entire system will not become excessively weak, and a shortening of the total length can be favorably realized. In addition, by maintaining the combined focal length f12 of the first lens L1 and the second lens L2 with respect to the focal length f of the entire system such that the value of f/f12 is not greater than or equal to the upper limit defined in Conditional Formula (8), the combined refractive power of the first lens L1 and the second lens L2 with respect to the refractive power of the entire system will not become excessively strong, and spherical aberration can be favorably corrected. From the above viewpoint, it is more preferable for Conditional Formula (8-1) below to be satisfied.

$$0.25 < f/f12 < 0.56 \tag{8-1}$$

In addition, it is preferable for the distance D9 between the fourth lens L4 and the fifth lens L5 along the optical axis and the focal length f of the entire system to satisfy Conditional Formula (9) below.

$$0.1 < D9/f < 0.5 \tag{9}$$

Conditional Formula (9) defines a preferable range of numerical values of the ratio of the distance D9 between the fourth lens L4 and the fifth lens L5 along the optical axis with respect to the focal length f of the entire system, that suppresses an increase from the first lens L1 to the fifth lens L5 along the optical axis and shortens the amount of back focus, in order to shorten the total length, correct field curvature, and widen the angle of view. In each of the imaging lenses of the present specification, the fifth lens L5 has a negative refractive power. Therefore, the combined refractive power of the first lens L1 through the fourth lens L4 will necessarily be positive. For this reason, by setting the distance D9 between the fourth lens L4 and the fifth lens L5 along the optical axis with respect to the focal length f of the entire system such that the value of D9/f is not less than or equal to the lower limit defined in Conditional Formula (9), the position of the rearward principal point of the imaging lens can be moved more toward the object side, and a shortening of the total length can be favorably realized. In addition, in the case that the distance D9 between the fourth lens L4 and the fifth lens L5 along the optical axis with respect to the focal length f of the entire system is set such that the value of D9/f is not less than or equal to the lower limit defined in Conditional Formula (9), approximately the same amount of refractive power can be realized in the entire system, while the negative refractive power of the fifth lens L5 can be increased with respect to the combined refractive power of the first lens through fourth lens L4 compared to a case in which the distance D9 between the fourth lens L4 and the fifth lens L5 along the optical axis with respect to the focal length f of the entire system is set such that the value of D9/f is less than or equal to the lower limit defined in Conditional Formula (9). Therefore, the Petzval sum can be decreased, field curvature can be favorably corrected, and widening of the angle of view can be favorably realized. In addition, by setting the distance D9 between the fourth lens L4 and the fifth lens L5 along the optical axis with respect to the focal length f of the entire system such that the value of D9/f is not greater than or equal to the upper limit defined in Conditional Formula (9), the distance from the first lens L1 to the fifth lens L5 along the optical axis can be reduced. Therefore, the total length can be favorably shortened. From the above viewpoint, it is more preferable for Conditional Formula (9-1) below to be satisfied.

$$0.12 < D9/f < 0.3 \tag{9-1}$$

In addition, it is preferable for the configurations of each of the first through fifth lenses of the imaging lens L to be set such that the full angle of view 2ω is 70 degrees or greater. Particularly in photography devices such as cellular telephones, in which photographed images are employed after being enlarged by a digital zoom function, wide angle imaging lenses are in demand in order to realize a greater photography range. For this reason, in the case that the configurations of each of the first through fifth lenses of the imaging lens L is set such that the full angle of view 2ω is 70 degrees or greater, photographed images can be obtained with a wide angle of view. As a result, the imaging lens L can be favorably applied to photography devices having the aforementioned digital zoom function.

Next, the imaging lenses of Examples 2 through 6, 9, and 11 of the present invention will be described in detail with reference to FIGS. 2 through 6, 9, and 11. Note that each of the imaging lenses of Examples 2 through 6, 9, and 11 of the present invention are constituted by: a first lens L1 having a positive refractive power and is of a meniscus shape with a convex surface toward the object side; a second lens L2 having a negative refractive power; a third lens L3 having a positive refractive power and a convex surface toward the object side; a fourth lens L4 having a positive refractive power and a convex surface toward the object side; and a fifth lens L5 having a negative refractive power, a concave surface toward the image side in the vicinity of the optical axis on the surface thereof toward the image side in the vicinity of the optical axis, and an inflection point on the surface thereof toward the image side, provided in this order from the object side. For this reason, other detailed configurations of each lens that constitutes each lens group will be described with respect to Examples 2 through 6, 9, and 11 hereinbelow. In addition, the operational effects of configurations which are common to Examples 1 through 6, 9, and 11 are the same. Therefore, configurations and operational effects will be described for Examples having smaller numbers first, and redundant descriptions of these configurations and operational effects will be omitted.

Figure 2:
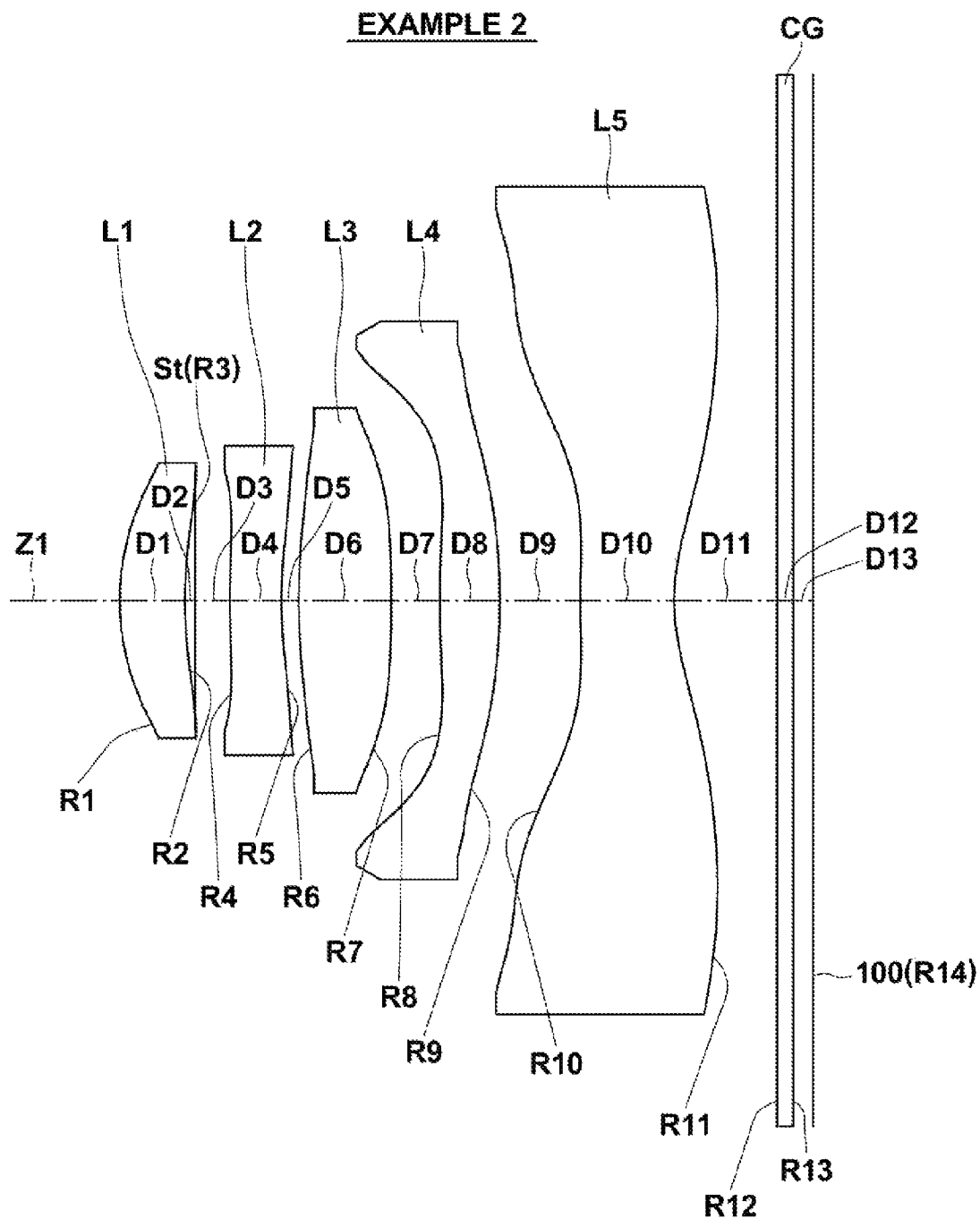
FIG. 2 is a sectional diagram that illustrates a second example of the configuration of an imaging lens according to an embodiment of the present invention, and corresponds to a lens of Example 2.

It is possible for the imaging lens to adopt a configuration in which the second lens L2 is of a meniscus shape having a convex surface toward the object side, and the third lens L3 is of a biconvex shape, as in Example 2 illustrated in FIG. 2. In the case that the second lens L2 is of a meniscus shape having a convex surface toward the object side, such a configuration is advantageous from the viewpoint of shortening the total length. In addition, in the case that the third lens L3 is of a biconvex shape, spherical aberration can be more favorably corrected. In addition, the lens configurations of the first lens, the fourth lens L4, and the fifth lens L5 of the imaging lens of Example 2 are the same as those of Example 1. The operational effects corresponding to each of these configurations of the imaging lens of Example 1 are obtained by these lens configurations.

Figure 3:
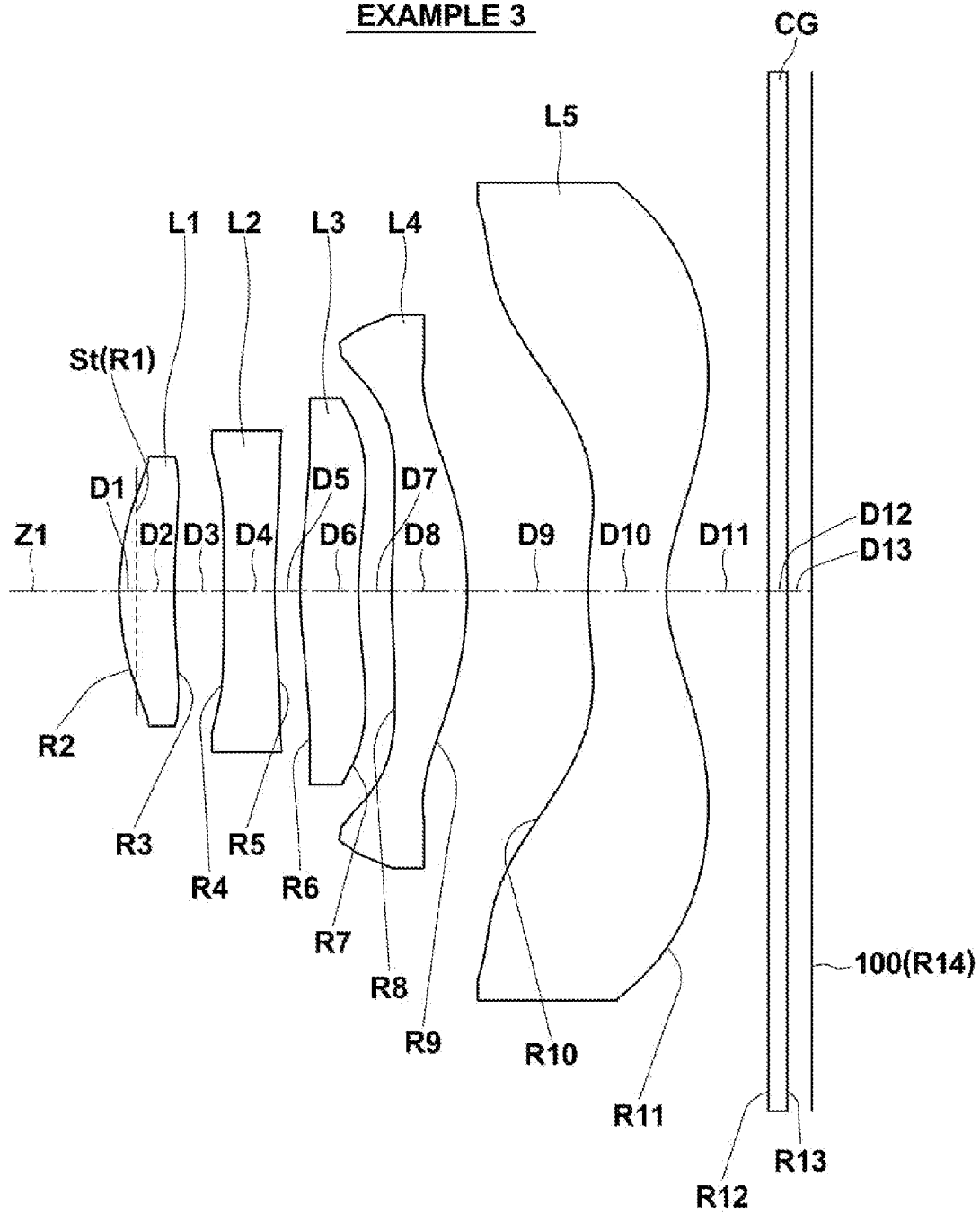
FIG. 3 is a sectional diagram that illustrates a third example of the configuration of an imaging lens according to an embodiment of the present invention, and corresponds to a lens of Example 3.

In addition, the aperture stop St may be positioned at the object side of the surface of the first lens L1 toward the object side, and positioned at the image side of the apex of the surface of the first lens L1 toward the object side, as in Example 3 illustrated in FIG. 3. In the case that this configuration is adopted, such a configuration is advantageous from the viewpoint of shortening the total length of the lens as described previously. In addition, the lens configuration of the second lens L2 of the imaging lens of Example 3 is the same as that of Example 2, and the lens configurations of the first lens L1 and the third lens L3 through the fifth lens L5 are the same as those of Example 1. The operational effects corresponding to each of these configurations of the imaging lenses of Example 1 and Example 2 are obtained by these lens configurations.

Figure 4:
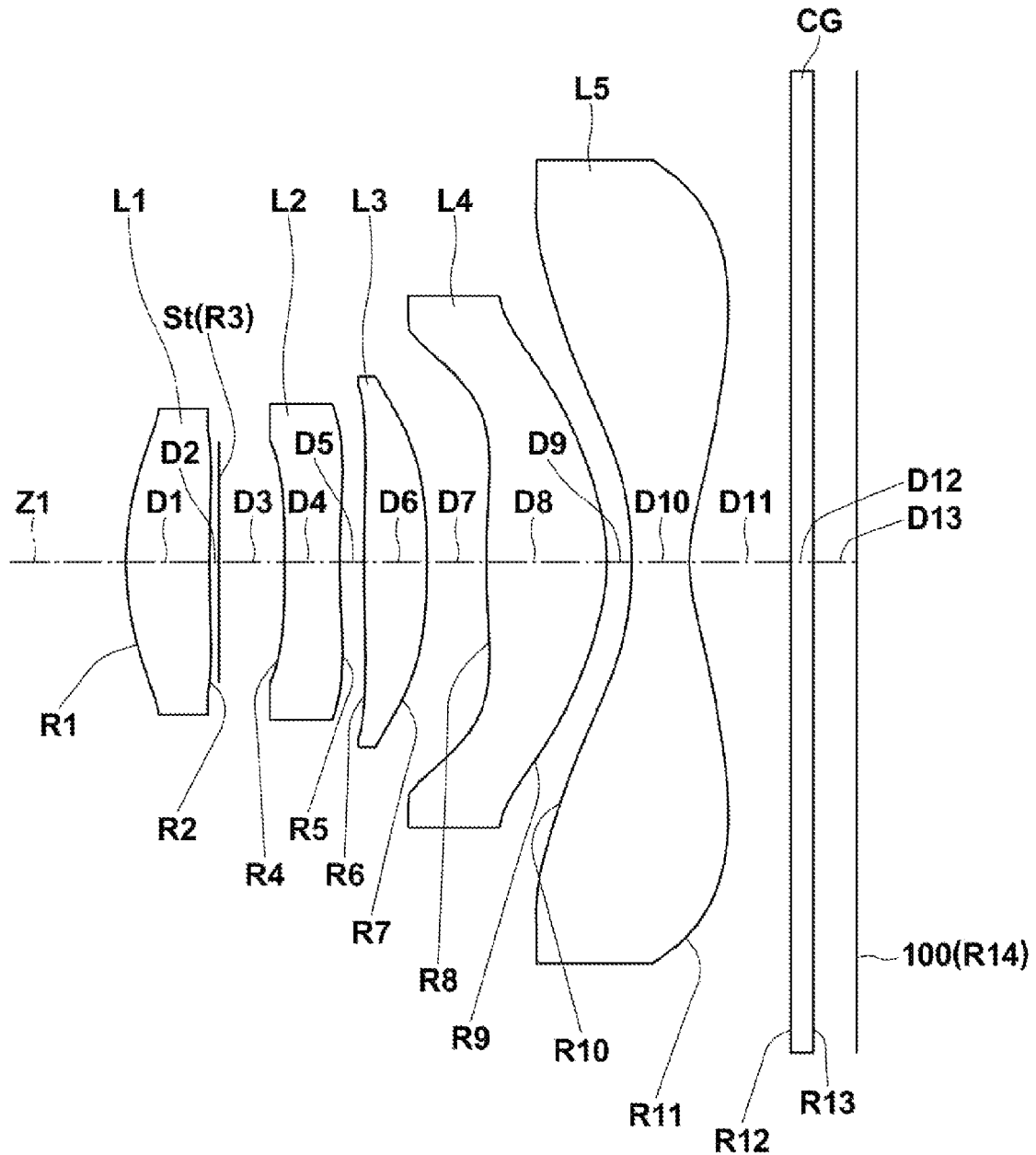
FIG. 4 is a sectional diagram that illustrates a fourth example of the configuration of an imaging lens according to an embodiment of the present invention, and corresponds to a lens of Example 4.

In addition, the lens configurations of the first lens L1, the second lens L2, the fourth lens L4, and the fifth lens L5 may be the same as those of Example 1, and the lens configuration of the third lens L3 may be the same as that of Example 2, as in Example 4 illustrated in FIG. 4. The operational effects corresponding to each of these configurations of the imaging lenses of Example 1 and Example 2 are obtained by these lens configurations.

Figure 5:
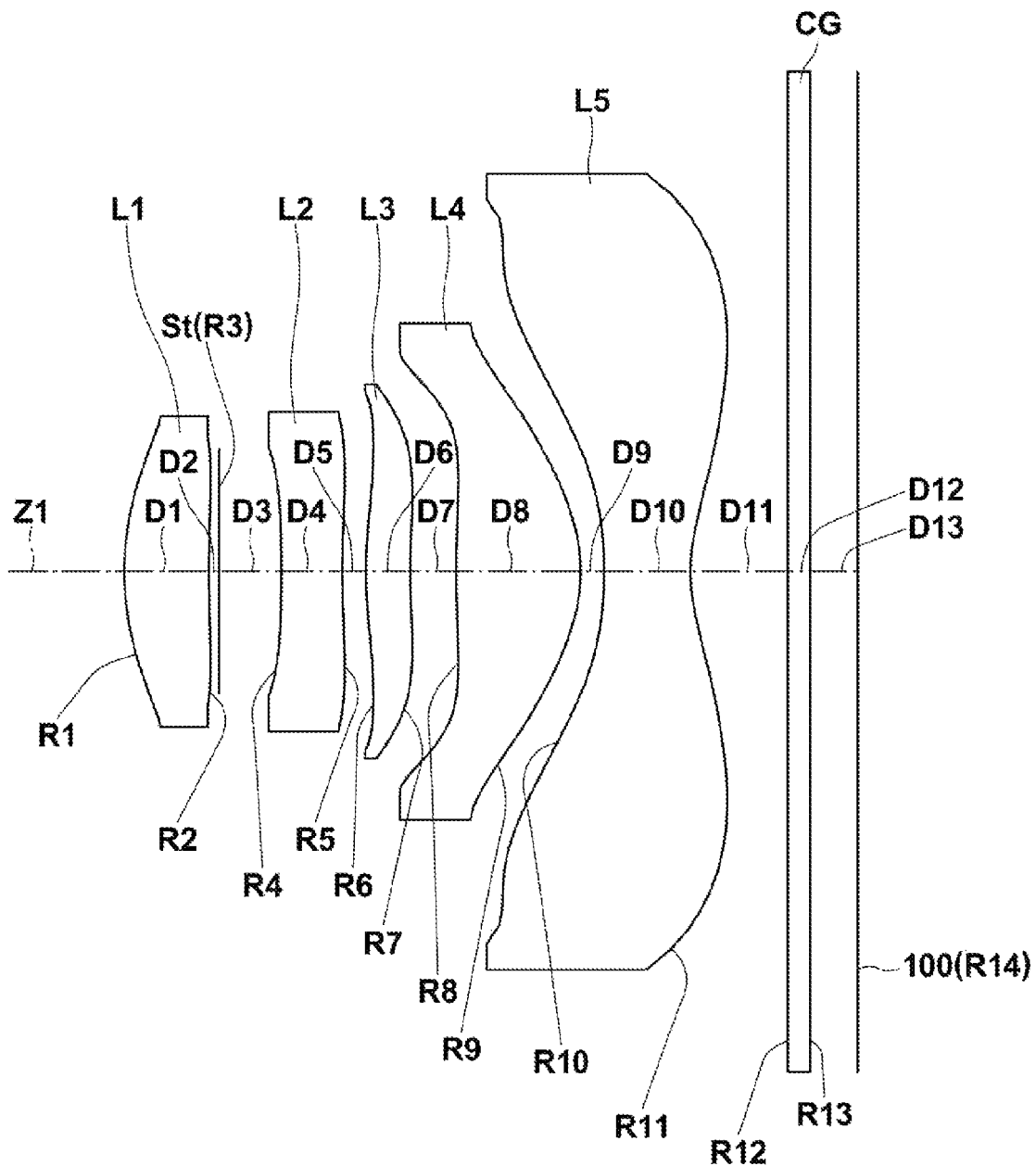
FIG. 5 is a sectional diagram that illustrates a fifth example of the configuration of an imaging lens according to an embodiment of the present invention, and corresponds to a lens of Example 5.

In addition, the fifth lens L5 may be configured to have a biconcave shape in the vicinity of the optical axis as in Example 5 illustrated in FIG. 5. In the case that the fifth lens L5 is of a biconcave shape in the vicinity of the optical axis, the absolute value of the curvature of the surface of the fifth lens L5 toward the image side can be decreased. As a result, astigmatism can be favorably corrected. In addition, the lens configurations of the first lens L1 through the fourth lens L4 of the imaging lens of Example 5 are the same as those of Example 1. The operational effects corresponding to each of these configurations of the imaging lens of Example 1 are obtained by these lens configurations.

Figure 6:
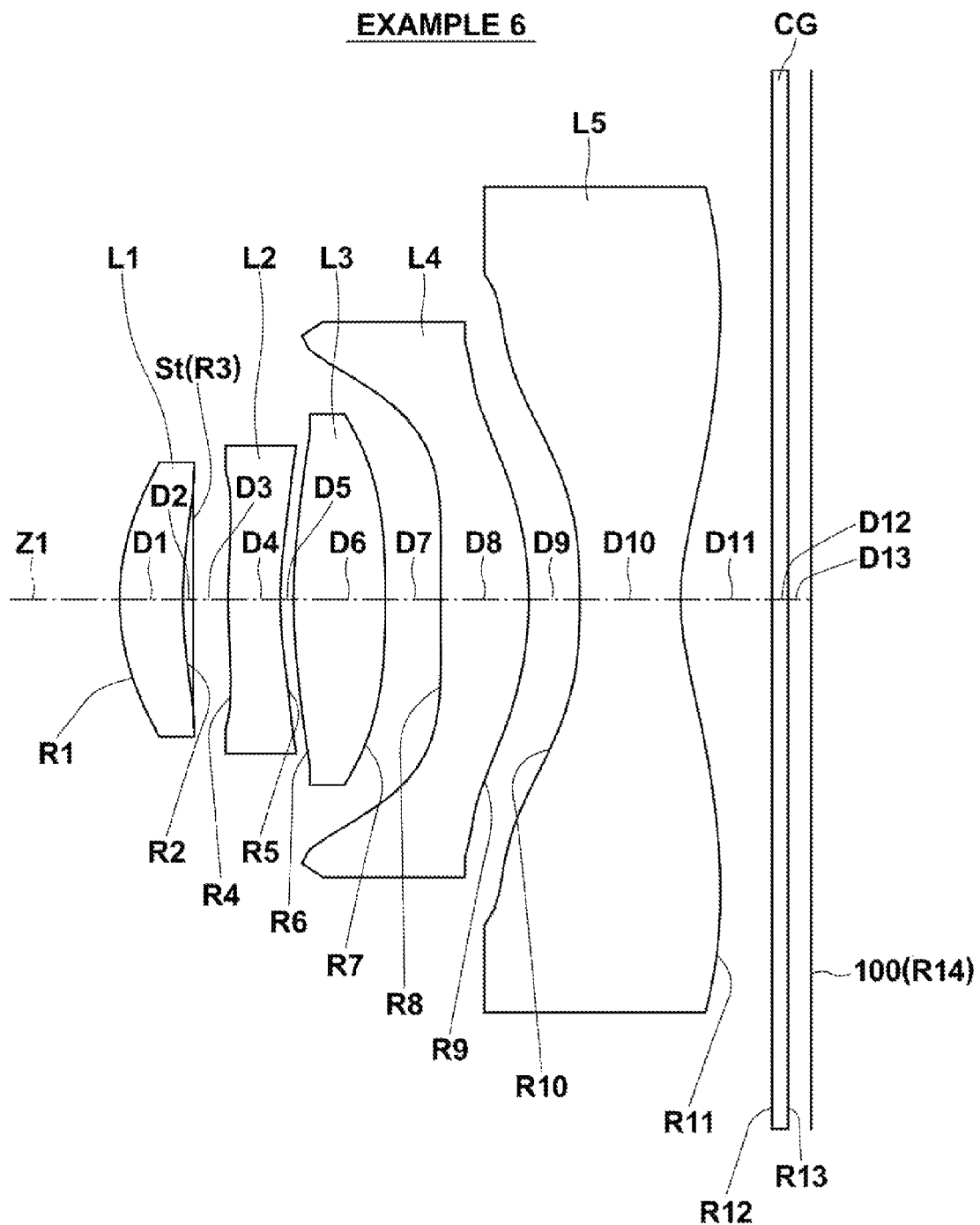
FIG. 6 is a sectional diagram that illustrates a sixth example of the configuration of an imaging lens according to an embodiment of the present invention, and corresponds to a lens of Example 6.

In addition, the imaging lens L may be configured by adopting lens configurations for the first lens L1 through the fourth lens L4 which are the same as those of Example 2, and a lens configuration for the fifth lens L5 which is the same as that of Example 5, as in Example 6 illustrated in FIG. 6. The operational effects corresponding to each of the lens configurations of the imaging lenses of Example 2 and Example 5 are obtained, by Example 6 adopting the above lens configurations for the first through fifth lenses.

Figure 7:
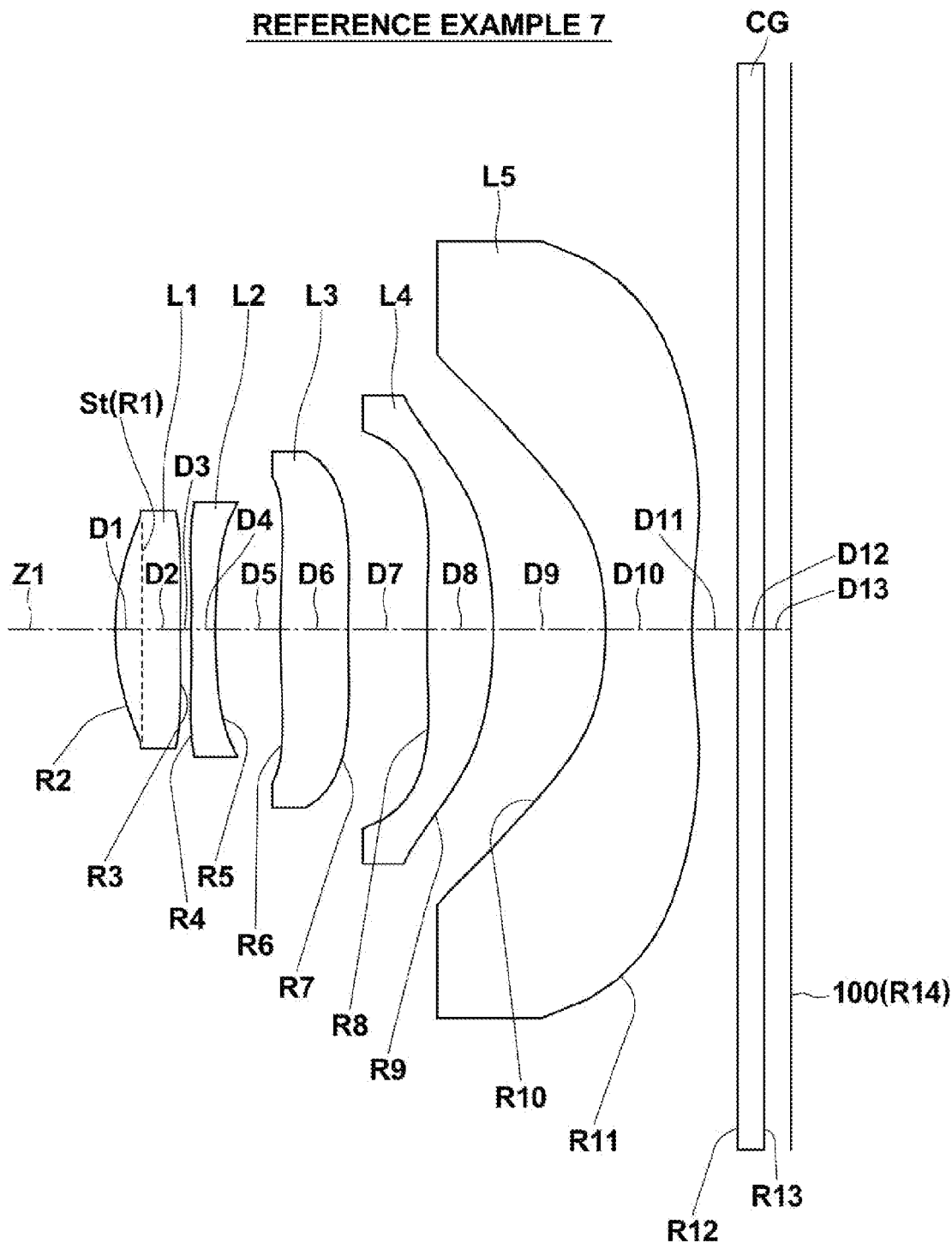
FIG. 7 is a sectional diagram that corresponds to a lens of Reference Example 7.

In addition, the imaging lens L may be configured by adopting lens configurations for the first lens L1 through the fourth lens L4 which are the same as those of Example 3, and a lens configuration for the fifth lens L5 which is the same as that of Example 5, as in Reference Example 7 illustrated in FIG. 7. The operational effects corresponding to each of the lens configurations of the imaging lenses of Example 3 and Example 5 are obtained, by Reference Example 7 adopting the above lens configurations for the first through fifth lenses.

Figure 8:
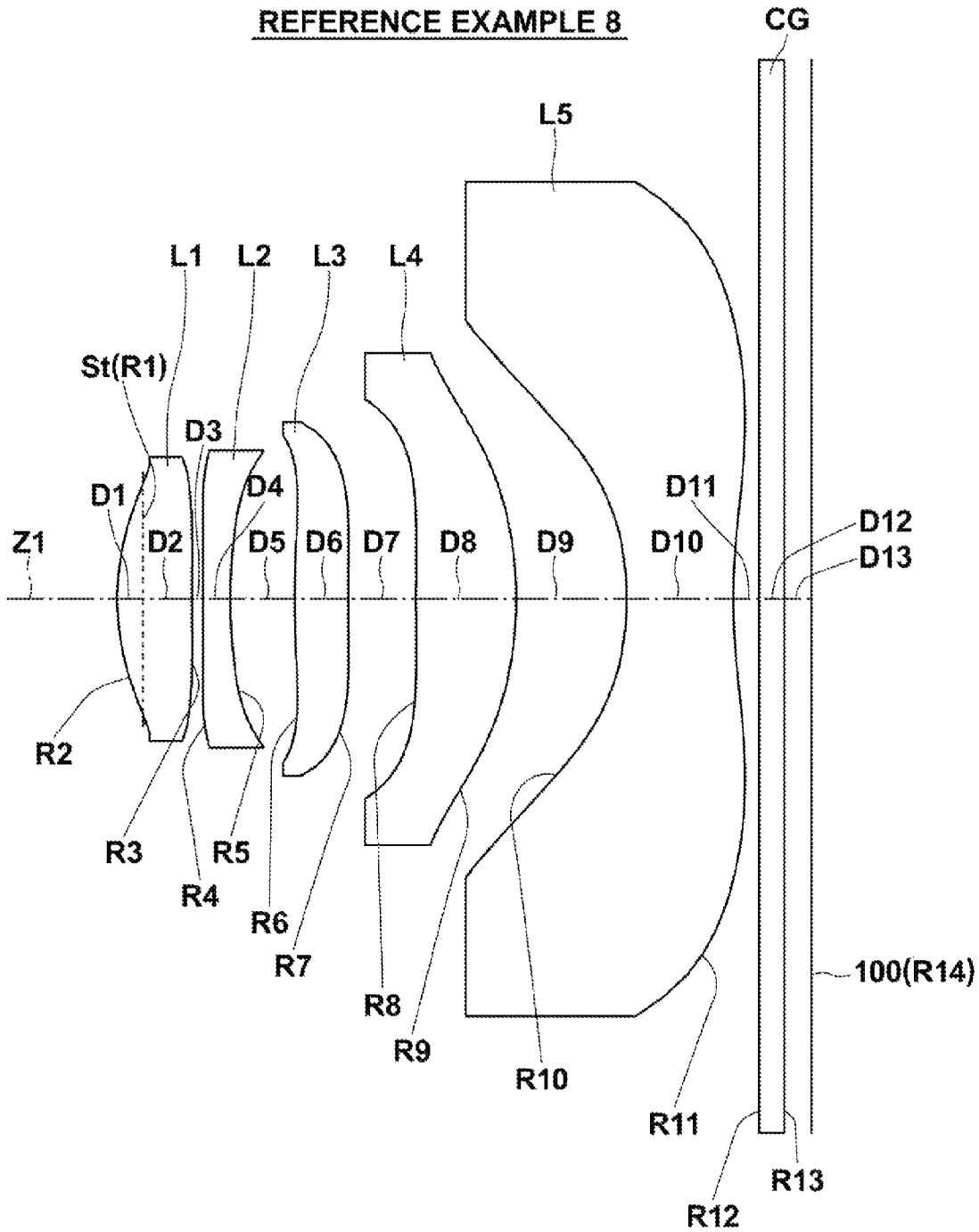
FIG. 8 is a sectional diagram that corresponds to a lens of Reference Example 8.

In addition, the imaging lens of Reference Example 8 illustrated in FIG. 8 has the same lens configurations for the first lens L1 through the fifth lens L5 as those of Reference Example 7. The operational effects corresponding to each of the lens configurations of the imaging lens of Reference Example 7 are obtained by Reference Example 8 adopting the above lens configurations.

Figure 9:
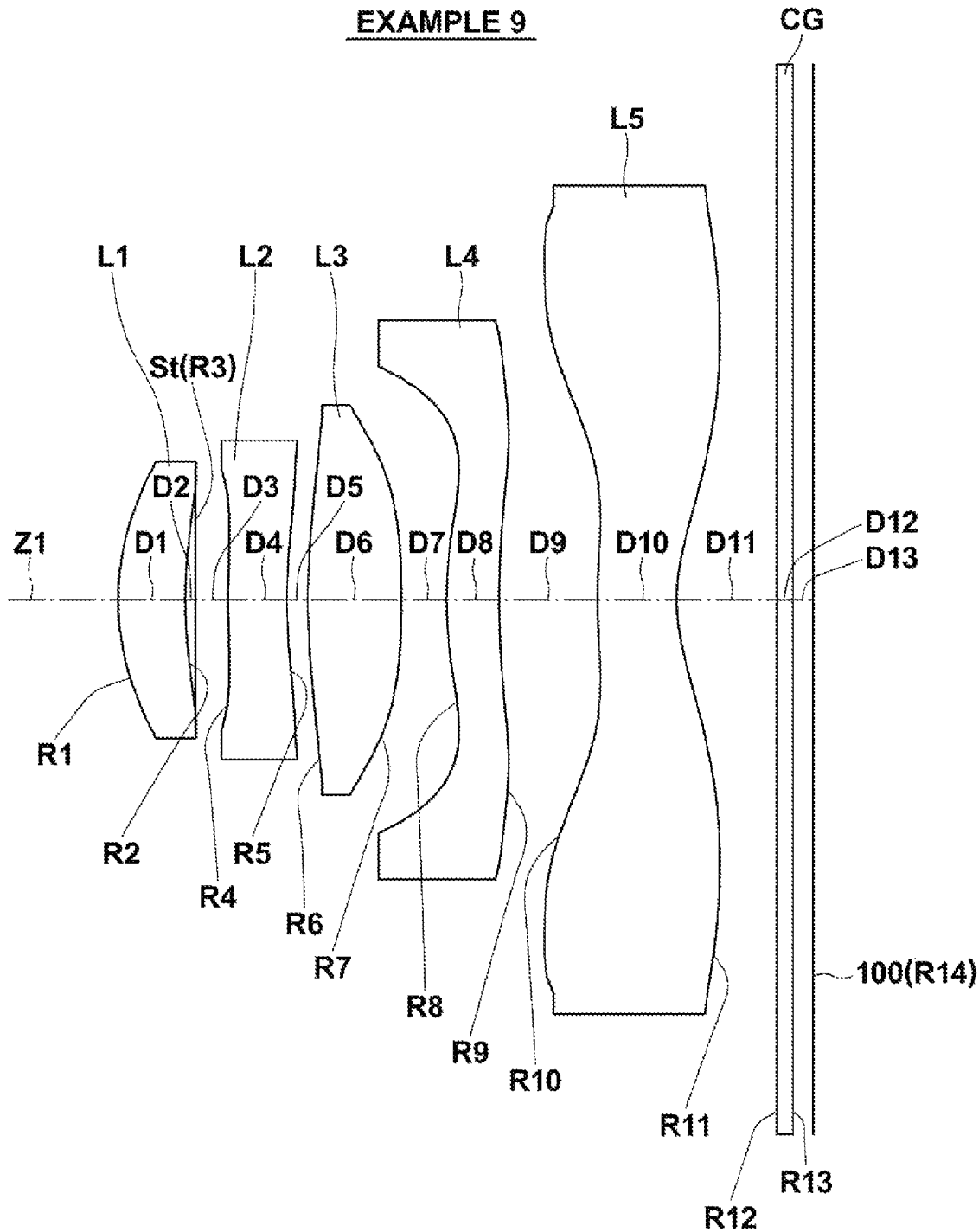
FIG. 9 is a sectional diagram that illustrates a ninth example of the configuration of an imaging lens according to an embodiment of the present invention, and corresponds to a lens of Example 9.

In addition, the fourth lens L4 may be of a meniscus shape having a convex surface toward the object side, as in Example 9 illustrated in FIG. 9. The total length can be more favorably shortened in the case that the fourth lens L4 is of a meniscus shape having a convex surface toward the object side. The lens configurations of the first lens L1 through the third lens L3 and the fifth lens L5 of the imaging lens of Example 9 are the same as those of Example 2. The operational effects corresponding to each of these configurations of the imaging lens of Example 2 are obtained by these lens configurations.

Figure 10:
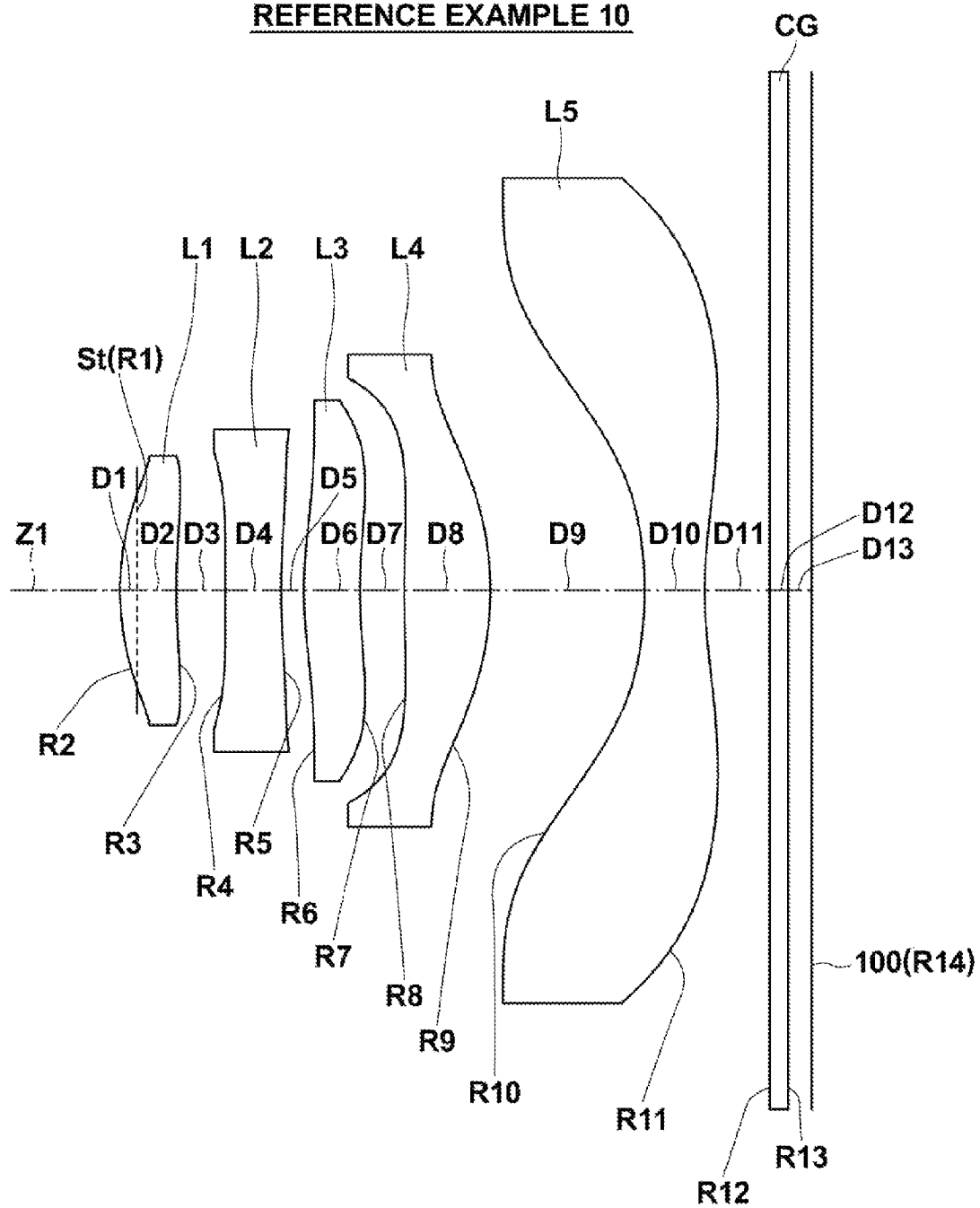
FIG. 10 is a sectional diagram that corresponds to a lens of Reference Example 10.

In addition, the imaging lens of Reference Example 10 illustrated in FIG. 10 has the same lens configurations for the first lens L1 through the fifth lens L5 as those of Reference Example 7. The operational effects corresponding to each of the lens configurations of the imaging lens of Reference Example 7 are obtained by Reference Example 10 adopting the above lens configurations.

Figure 11:
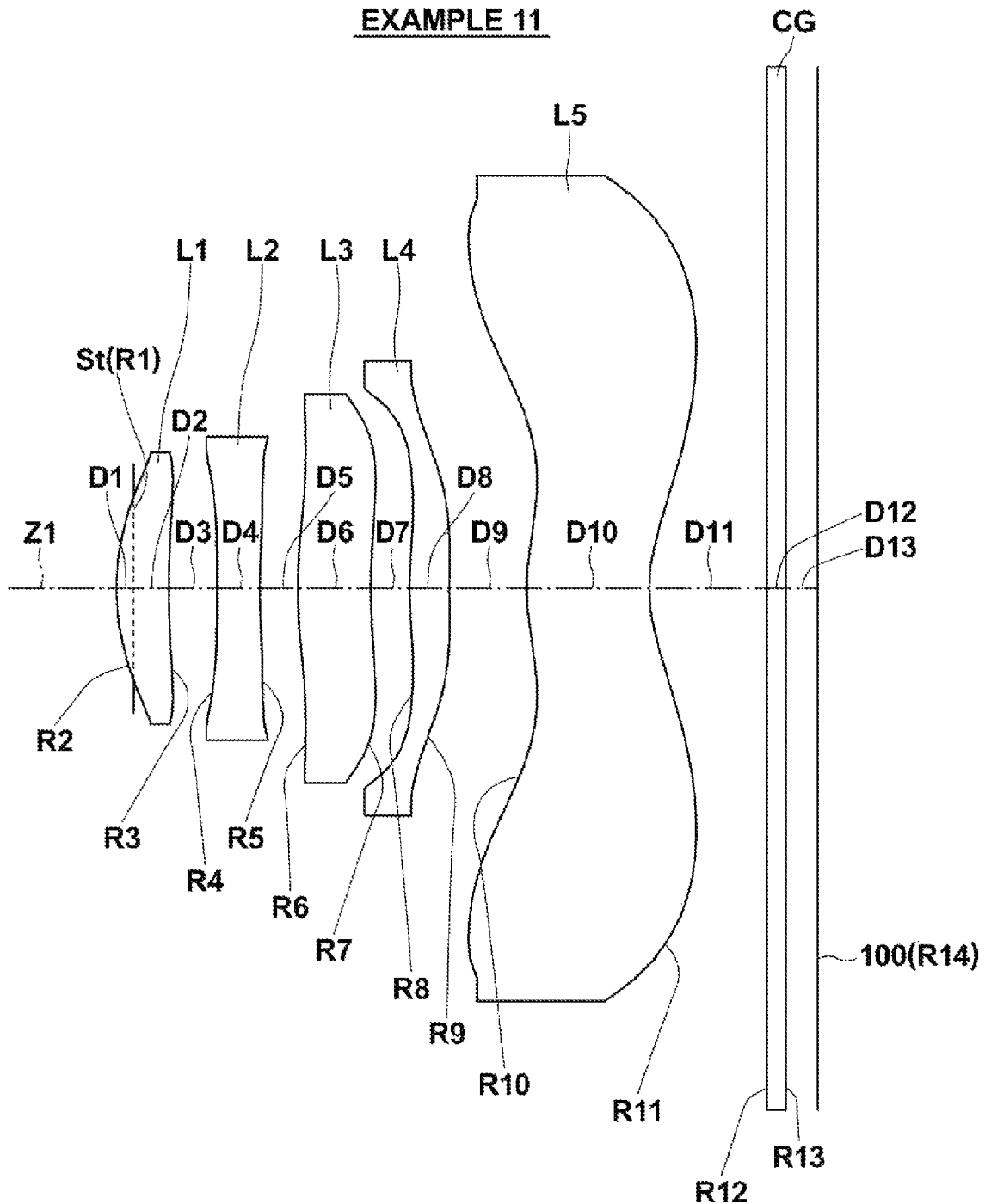
FIG. 11 is a sectional diagram that illustrates a eleventh example of the configuration of an imaging lens according to an embodiment of the present invention, and corresponds to a lens of Example 11.

In addition, the imaging lens L may be configured to have a lens configuration for the fourth lens L4 which is the same as that of Example 9, and lens configurations for the first lens L1 through the third lens L3 and the fifth lens L5 which are the same as those of Example 3, as in Example 11 illustrated in FIG. 11. The operational effects corresponding to each of the lens configurations of the imaging lenses of Example 3 and Example 9 are obtained, by Example 11 adopting the above lens configurations for the first through fifth lenses.

As described above, according to the imaging lens L of the embodiment of the present invention, the configuration of each lens element is optimized within a lens configuration having five lenses as a whole. Particularly, the shapes of the first lens, the third lens, the fourth lens, and the fifth lens are favorably configured. Therefore, a lens system that can achieve a short total length and high imaging performance can be realized.

Further improved imaging performance can be realized by satisfying preferred conditions appropriately. In addition, the imaging apparatuses according to the embodiments of the present invention output image signals corresponding to optical images formed by the high performance imaging lens according to the embodiment of the present invention. Therefore, photographed images having high resolution from a central angle of view to peripheral angles of views can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Particularly, Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first (the aperture stop St is first), are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface (Si) and an i+1st surface (Si+1) from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. In addition, the values of the focal length f (mm) of the entire system and the back focus Bf (mm) are shown as item data in Table 1. Note that the back focus Bf is represented as an air converted value, and an air converted value is employed as the portion of the total length TL of the lens corresponding to the back focus Bf.

In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and K represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / \{1 + (1 - K \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (n is an integer 3 or greater), and K is an aspherical surface coefficient.

Specific lens data corresponding to the configurations of the imaging lenses illustrated in FIG. 2 are shown in Table 3 and Table 4 in the same manner as for the imaging lens of Example 1. Similarly, specific data corresponding to the configurations of the imaging lenses illustrated in FIGS. 3 through 6, FIG. 9, and FIG. 11 are shown in Tables 5 through 12, Tables 17, 18, 21 and 22, as Examples 3 through 6, Example 9, and Example 11. In addition, Tables 13 through 16 and Tables 19 and 20 show lens data of Reference Examples 7, 8, and 10. In the imaging lenses of Examples 1 through 6, 9, and 11, both of the surfaces of the first lens L1 through the sixth lens L6 are all aspherical surfaces.

Figure 12:
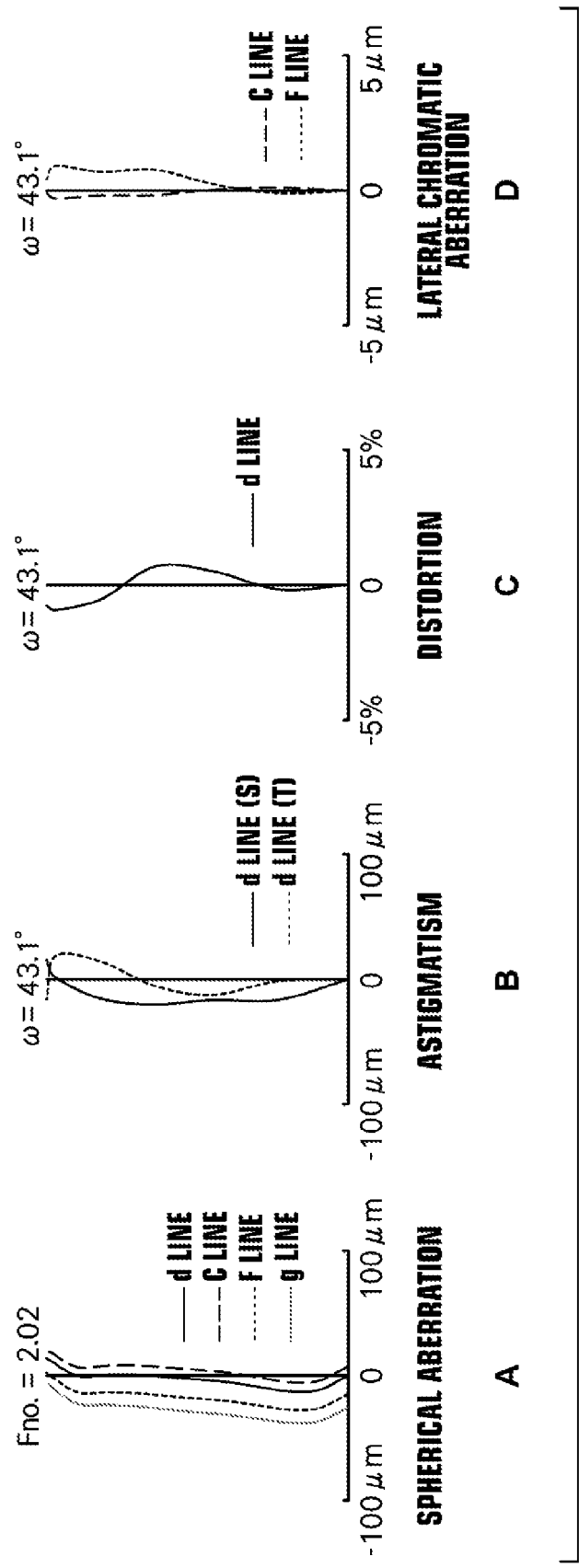
FIG. 12 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 12 are diagrams that illustrate the spherical aberration, the astigmatic aberration, the distortion (distortive aberration), and the lateral chromatic aberration (chromatic aberration according to magnification rate) of the imaging lens of Example 1, respectively. Each of the diagrams that illustrate the spherical aberration, the astigmatic aberration (field curvature), and the distortion (distortive aberration) illustrate aberrations using the d line (wavelength: 587.56 nm) as a reference wavelength. The diagrams that illustrate spherical aberration and lateral chromatic aberration also show aberrations related to the F line (wavelengths: 486.1 nm) and the C line (wavelength: 656.27 nm). Ina addition, the diagram that illustrates spherical aberration also show aberrations related to the g line (wavelength: 435.83 nm). In the diagram that illustrates astigmatic aberration, aberrations in the sagittal direction (S) are indicated by solid lines, while aberrations in the tangential direction (T) are indicated by broken lines. In addition, "Fno." denotes an F number, and "ω" denotes a half angle of view.

Figure 13:
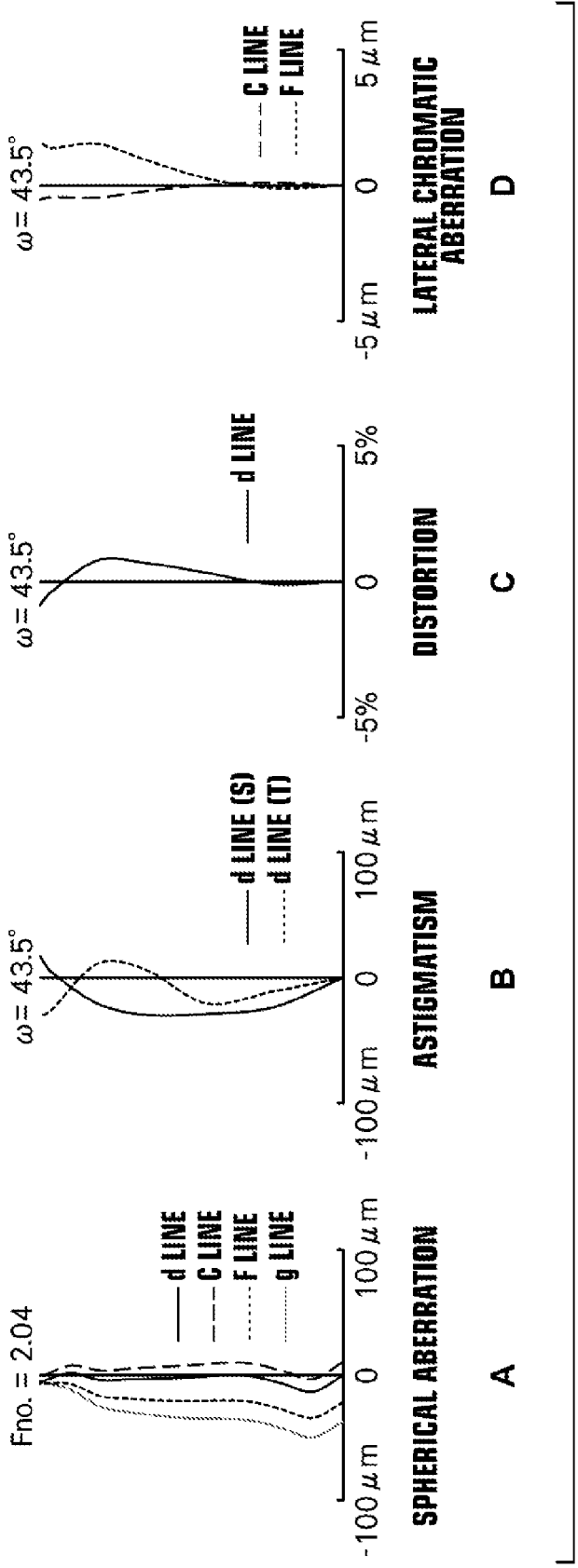
FIG. 13 is a collection of diagrams that illustrate aberrations of the imaging lens of Example 2, wherein A illustrates spherical aberration, B illustrates astigmatic aberration (field curvature), C illustrates distortion, and D illustrates lateral chromatic aberration.
Figure 14:
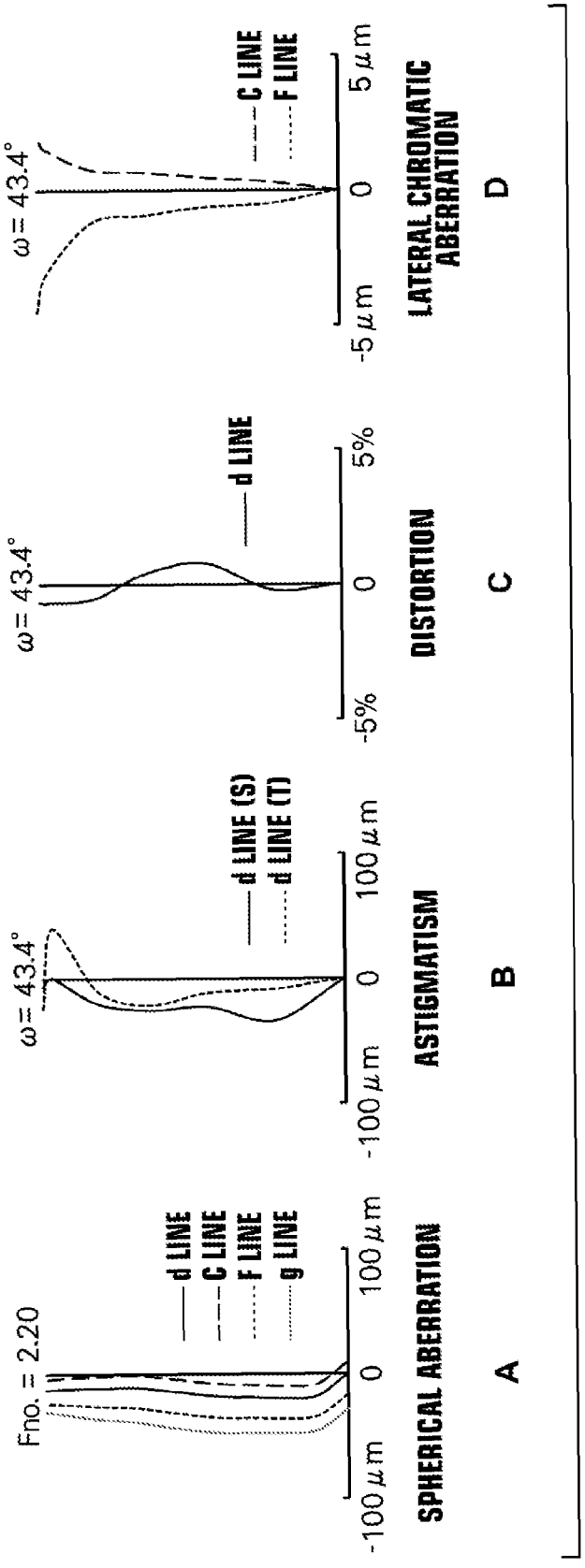
FIG. 14 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 15:
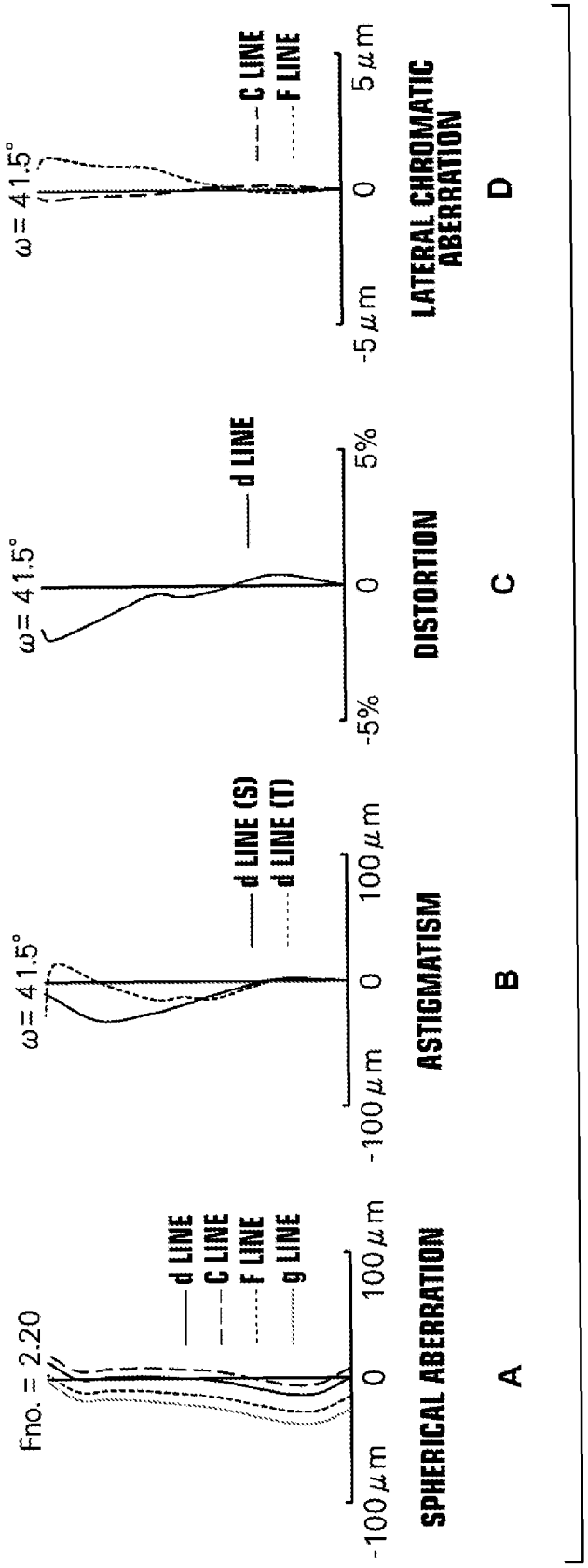
FIG. 15 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.
Figure 16:
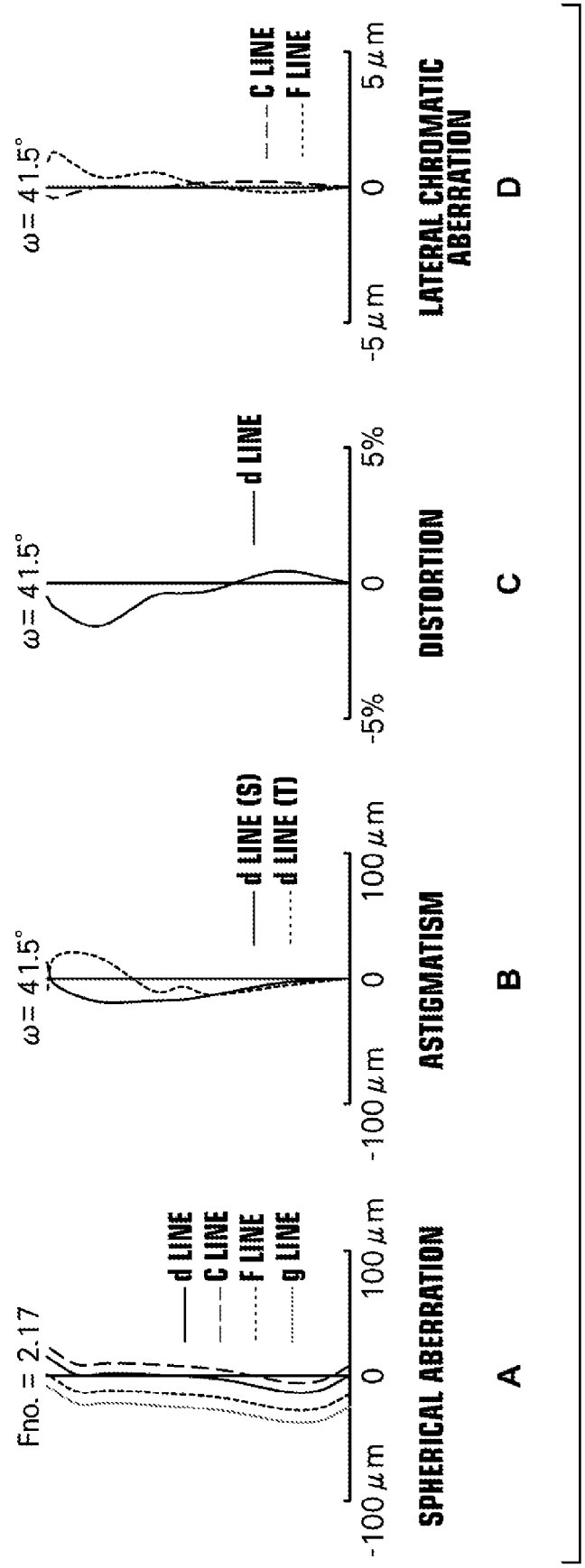
FIG. 16 is a collection of diagrams that illustrate aberrations of the imaging lens of Example 5, wherein A illustrates spherical aberration, B illustrates astigmatic aberration (field curvature), C illustrates distortion, and D illustrates lateral chromatic aberration.
Figure 17:
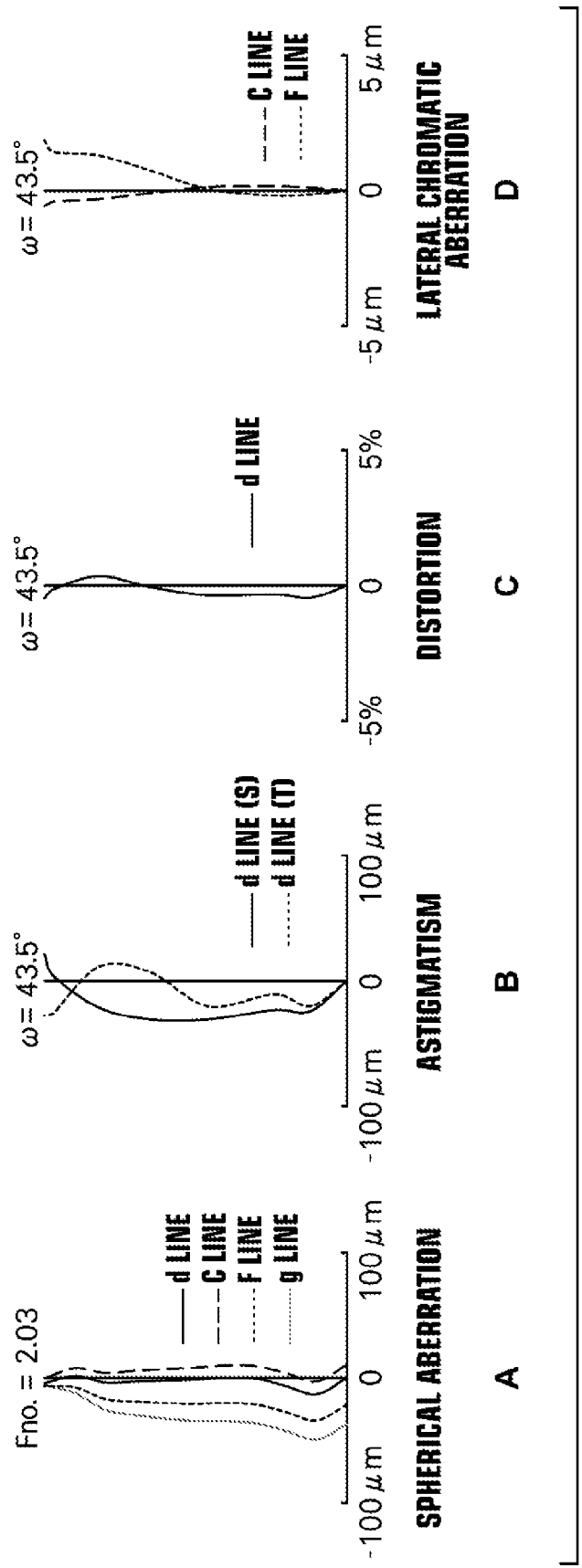
FIG. 17 is a collection of diagrams that illustrate aberrations of the imaging lens of Example 6, wherein A illustrates spherical aberration, B illustrates astigmatic aberration (field curvature), C illustrates distortion, and D illustrates lateral chromatic aberration.
Figure 18:
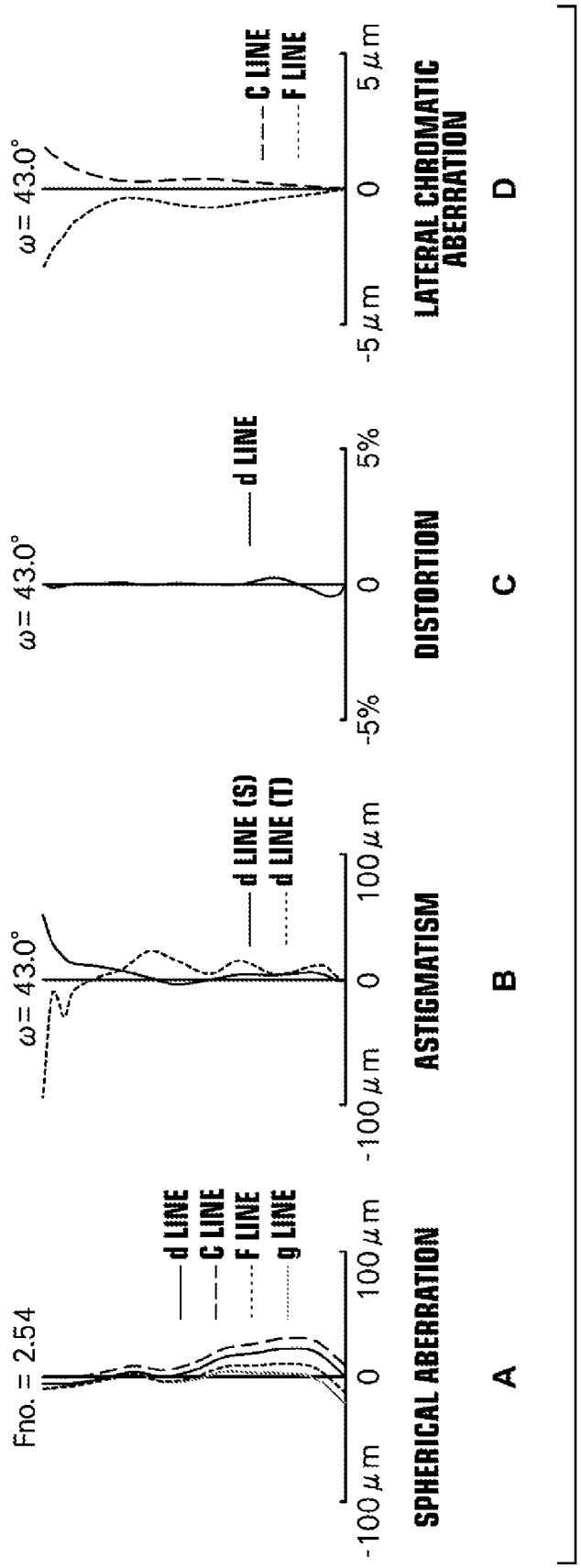
FIG. 18 is a collection of diagrams that illustrate aberrations of the imaging lens of Reference Example 7, wherein A illustrates spherical aberration, B illustrates astigmatic aberration (field curvature), C illustrates distortion, and D illustrates lateral chromatic aberration.
Figure 19:
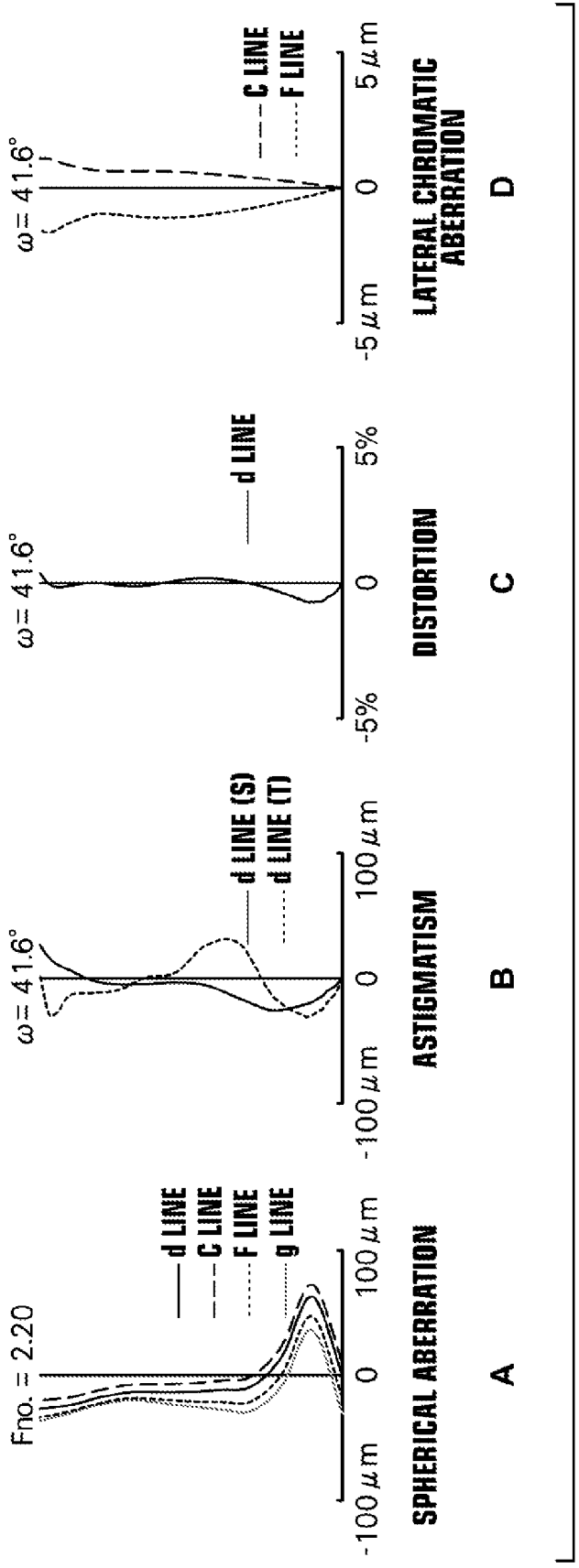
FIG. 19 is a collection of diagrams that illustrate aberrations of the imaging lens of Reference Example 8, wherein A illustrates spherical aberration, B illustrates astigmatic aberration (field curvature), C illustrates distortion, and D illustrates lateral chromatic aberration.
Figure 20:
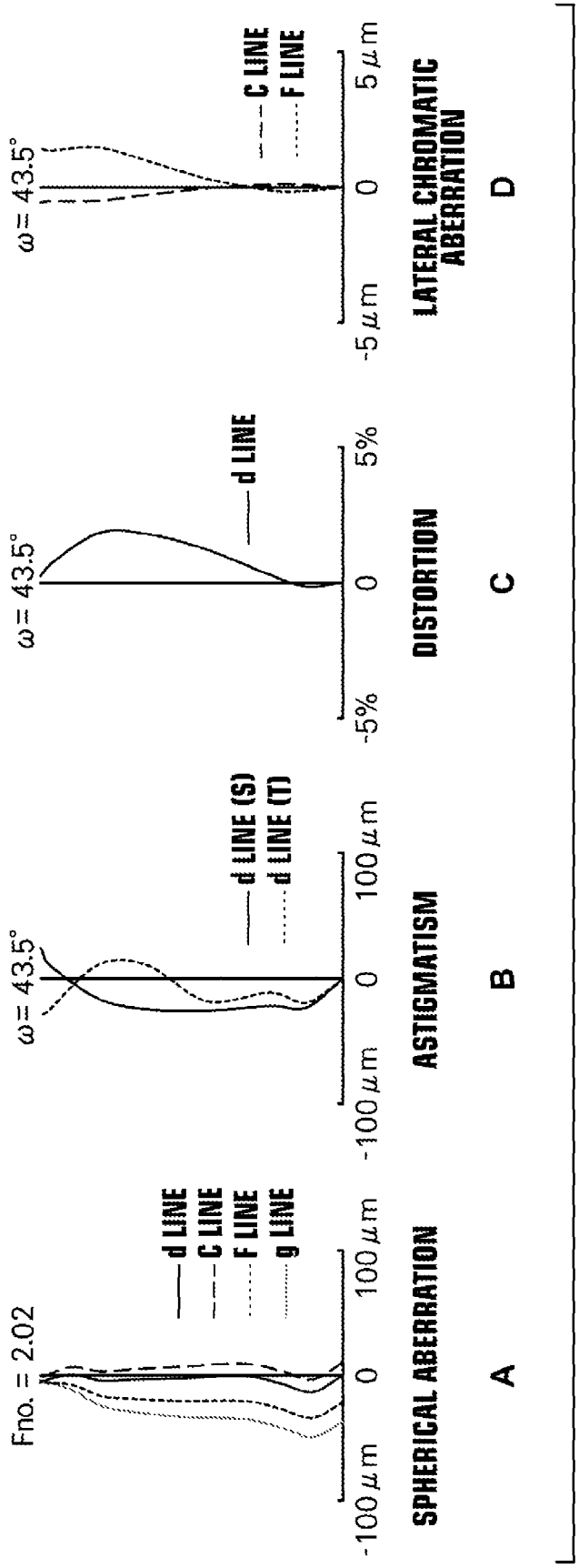
FIG. 20 is a collection of diagrams that illustrate aberrations of the imaging lens of Example 9, wherein A illustrates spherical aberration, B illustrates astigmatic aberration (field curvature), C illustrates distortion, and D illustrates lateral chromatic aberration.
Figure 21:
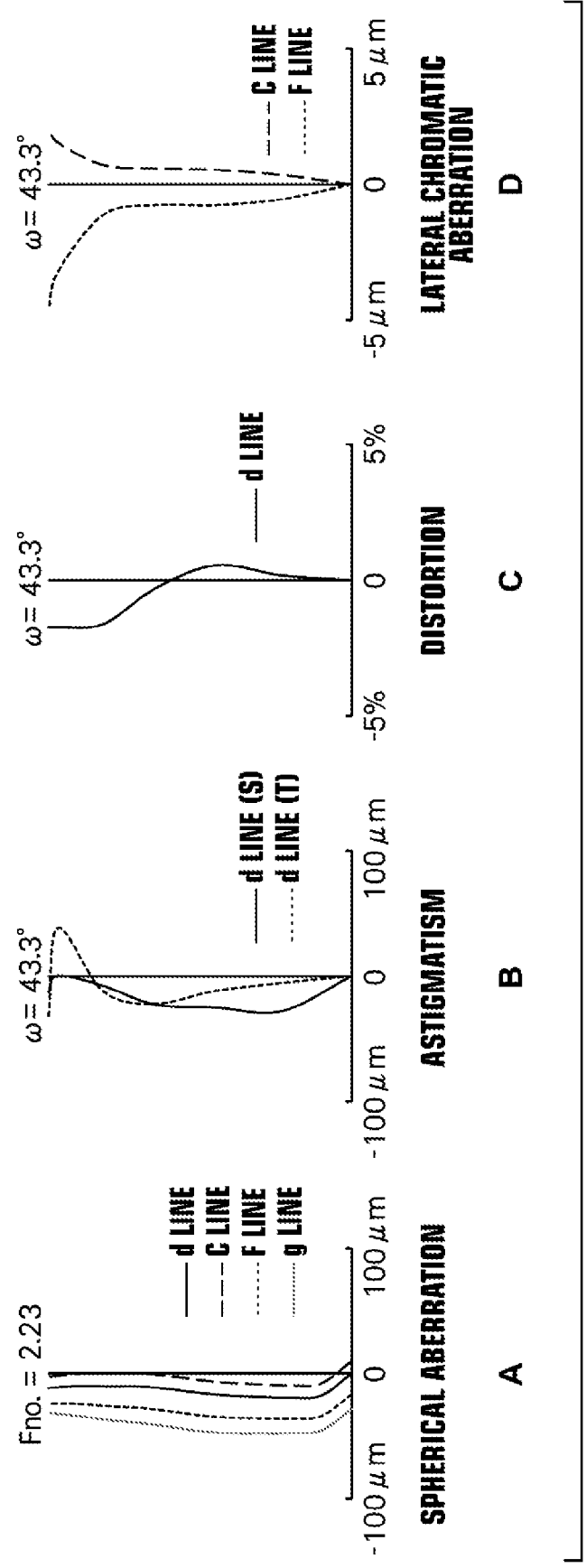
FIG. 21 is a collection of diagrams that illustrate aberrations of the imaging lens of Reference Example 10, wherein A illustrates spherical aberration, B illustrates astigmatic aberration (field curvature), C illustrates distortion, and D illustrates lateral chromatic aberration.
Figure 22:
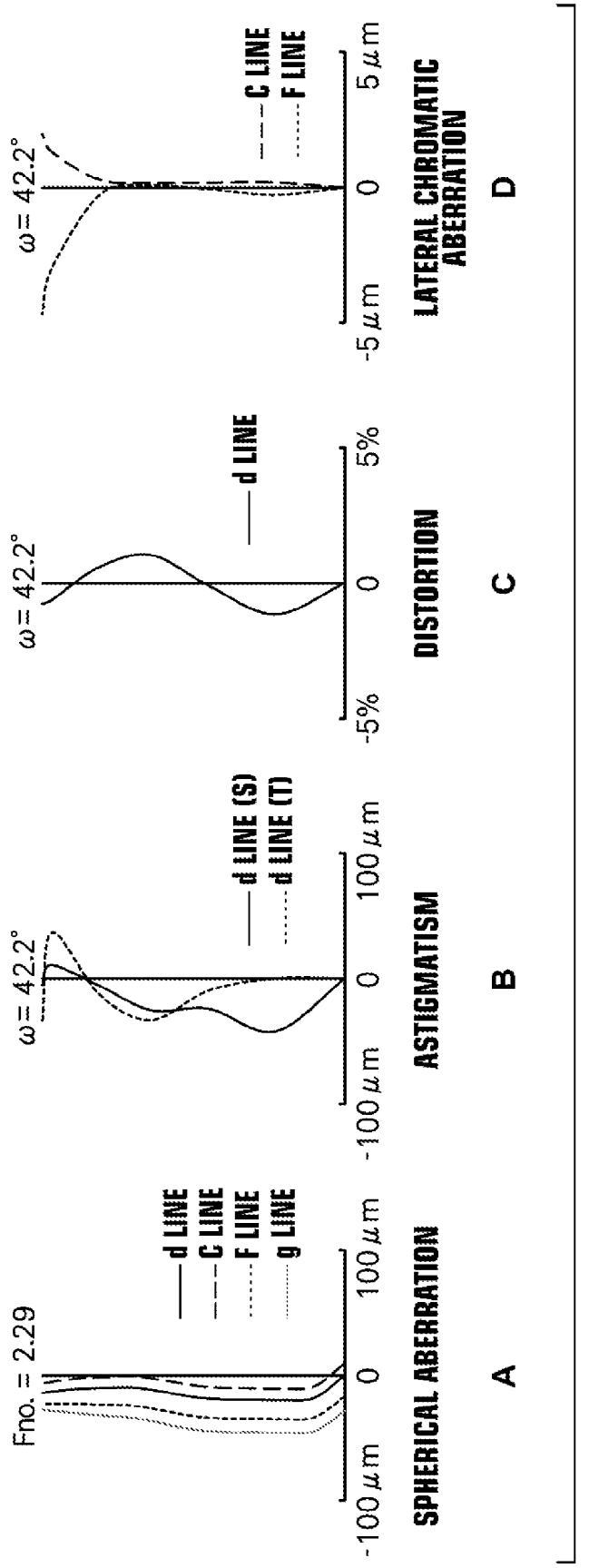
FIG. 22 is a collection of diagrams that illustrate aberrations of the imaging lens of Example 11, wherein A illustrates spherical aberration, B illustrates astigmatic aberration (field curvature), C illustrates distortion, and D illustrates lateral chromatic aberration.

Similarly, the aberrations of the imaging lens of Example 2 are illustrated in A through D of FIG. 13. Similarly, the aberrations of the imaging lenses of Example 3 through 6, Reference Example 7, Reference Example 8, Example 9, Reference Example 10, and Example 11 are illustrated in A through D of FIG. 14 through Figure A through D of FIG. 22.

In addition, Table 23 shows values corresponding to Conditional Formulae (1) through (9), respectively summarized for each of Examples 1 through 6, Reference Example 7, Reference Example 8, Example 9, Reference Example 10, and Example 11.

As can be understood from each set of numerical value data and from the diagrams that illustrate aberrations, each of the Examples realizes a shortening of the total length, a small F number, and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc. of each lens component are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

| | Example 1 f = 2.58, Bf = 0.74 | | | |
|---|---|---|---|---|
| Si | Ri | Di | Ndj | vdj |
| *1 | 1.28788 | 0.418 | 1.53391 | 55.89 |
| *2 | 5.11045 | 0.047 | | |
| 3 (aperture stop) | ∞ | 0.271 | | |
| *4 | −26.92949 | 0.250 | 1.63351 | 23.63 |
| *5 | 4.31306 | 0.100 | | |
| *6 | 2.66279 | 0.335 | 1.53391 | 55.89 |
| *7 | 2.97244 | 0.193 | | |
| *8 | 2.37283 | 0.469 | 1.54488 | 54.87 |
| *9 | −4.29023 | 0.114 | | |
| *10 | 1.05388 | 0.370 | 1.53391 | 55.89 |
| *11 | 0.58776 | 0.473 | | |
| 12 | ∞ | 0.110 | 1.51633 | 64.14 |
| 13 | ∞ | 0.195 | | |
| 14 (imaging plane) | ∞ | | | |

*aspherical surface

TABLE 2

Example 1: Aspherical Surface Data

| Surface Number | KA | A3 | A4 | A5 | A6 |
|---|---|---|---|---|---|
| 1  | 9.75054E−01  | −1.50984E−02 | 2.86007E−01  | −2.32145E+00 | 8.44412E+00  |
| 2  | 2.48632E+01  | 2.06869E−03  | −1.11265E−01 | −4.78828E−02 | −2.87123E−01 |
| 4  | −3.75363E+01 | 1.19496E−01  | −1.97747E+00 | 1.04861E+01  | −3.73117E+01 |
| 5  | 1.58952E+01  | 1.76256E−01  | −2.43598E+00 | 1.00488E+01  | −2.90308E+01 |
| 6  | −9.19091E−02 | −4.64557E−02 | −5.61857E−01 | −6.10598E−01 | 5.27905E+00  |
| 7  | 4.21550E+00  | −1.49806E−01 | 7.05904E−01  | −7.39950E+00 | 2.33315E+01  |
| 8  | 1.14843E+00  | 7.68955E−02  | −4.95774E−01 | 1.18703E+00  | −2.18347E+00 |
| 9  | 0.00000E+00  | −4.96235E−01 | 4.91010E−01  | 3.65949E−01  | 6.90532E−01  |
| 10 | −5.16627E+00 | −4.77366E−01 | −1.38480E+00 | 2.42431E+00  | −6.85433E−01 |
| 11 | −3.44097E+00 | 1.83290E−03  | −9.23645E−01 | 1.34671E+00  | −6.72523E−01 |

| Surface Number | A7 | A8 | A9 | A10 |
|---|---|---|---|---|
| 1  | −1.62147E+01 | 1.48861E+01  | −3.96346E+00 | −1.85543E+00 |
| 2  | 1.23918E+00  | −2.75256E+00 | 1.44997E+00  | 2.27311E−01  |
| 4  | 7.80626E+01  | −9.38445E+01 | 5.53631E+01  | −9.63712E+00 |
| 5  | 5.49845E+01  | −6.33738E+01 | 3.77769E+01  | −7.90567E+00 |
| 6  | −9.53089E+00 | 8.48458E+00  | −4.18864E+00 | 9.28400E−01  |
| 7  | −4.09640E+01 | 4.19941E+01  | −2.27542E+01 | 4.96538E+00  |
| 8  | 2.20284E+00  | −1.48455E+00 | 6.22148E−01  | −1.08221E−01 |
| 9  | −2.88085E+00 | 2.78079E+00  | −1.12963E+00 | 1.71170E−01  |
| 10 | −9.12875E−01 | 8.28107E−01  | −2.64039E−01 | 3.06325E−02  |
| 11 | −5.38013E−02 | 1.74448E−01  | −6.35684E−02 | 8.15866E−03  |

TABLE 3

Example 2
f = 3.23, Bf = 0.78

| Si | Ri | Di | Ndj | vdj |
|---|---|---|---|---|
| *1 | 1.42005 | 0.378 | 1.53391 | 55.89 |
| *2 | 2.65138 | 0.060 | | |
| 3 (aperture stop) | ∞ | 0.201 | | |
| *4 | 5.04958 | 0.300 | 1.63351 | 23.63 |
| *5 | 2.55278 | 0.100 | | |
| *6 | 3.41599 | 0.538 | 1.53391 | 55.89 |
| *7 | −16.96972 | 0.283 | | |
| *8 | 5.02639 | 0.347 | 1.54488 | 54.87 |
| *9 | −4.53903 | 0.470 | | |
| *10 | 6.01218 | 0.542 | 1.53391 | 55.89 |
| *11 | 1.15918 | 0.600 | | |
| 12 | ∞ | 0.092 | 1.51633 | 64.14 |
| 13 | ∞ | 0.117 | | |
| 14 (imaging plane) | ∞ | | | |

*aspherical surface

TABLE 4

Example 2: Aspherical Surface Data

| Surface Number | KA | A3 | A4 | A5 | A6 |
|---|---|---|---|---|---|
| 1  | 1.03688E+00  | 1.13346E−02  | −1.74264E−02 | −5.43141E−01 | 2.63453E+00  |
| 2  | 6.76779E+00  | 1.22454E−02  | −1.64688E−01 | 1.03526E−01  | −4.09774E−01 |
| 4  | 2.63265E+00  | 9.29142E−02  | −1.28469E+00 | 5.44632E+00  | −1.64301E+01 |
| 5  | −1.74632E+01 | 1.31741E−01  | −1.32243E+00 | 5.13173E+00  | −1.25929E+01 |
| 6  | −6.35890E+00 | −3.14869E−02 | 7.65602E−02  | −1.18064E+00 | 4.42384E+00  |
| 7  | 4.90319E+01  | −1.06906E−01 | 6.15188E−01  | −3.34843E+00 | 8.09585E+00  |
| 8  | 6.30453E+00  | 2.88455E−02  | −4.01473E−01 | 7.54143E−01  | −1.40261E+00 |
| 9  | −4.05442E+00 | −1.25295E−02 | −6.24693E−02 | −2.07484E−01 | 1.02927E+00  |
| 10 | −1.13106E+01 | 7.00101E−02  | −8.22827E−01 | 6.29501E−01  | −1.40765E−02 |
| 11 | −4.85157E+00 | 8.37355E−02  | −4.73144E−01 | 4.87833E−01  | −1.91488E−01 |

| Surface Number | A7 | A8 | A9 | A10 |
|---|---|---|---|---|
| 1 | −5.36357E+00 | 4.77618E+00  | −1.07701E+00 | −5.97604E−01 |
| 2 | 8.19402E−01  | −1.09928E+00 | 5.99782E−01  | −2.25159E−01 |
| 4 | 2.89953E+01  | −2.89619E+01 | 1.42087E+01  | −2.20041E+00 |
| 5 | 1.88854E+01  | −1.72811E+01 | 9.04290E+00  | −2.03372E+00 |
| 6 | −8.21730E+00 | 8.11868E+00  | −3.90809E+00 | 6.76344E−01  |

TABLE 4-continued

Example 2: Aspherical Surface Data

| | | | | |
|---|---|---|---|---|
| 7 | −1.12854E+01 | 9.21241E+00 | −4.10335E+00 | 7.90095E−01 |
| 8 | 1.58676E+00 | −1.05877E+00 | 3.30224E−01 | −2.17334E−02 |
| 9 | −1.85272E+00 | 1.68075E+00 | −7.29581E−01 | 1.18177E−01 |
| 10 | −1.47729E−01 | 8.55657E−02 | −2.94186E−02 | 4.63354E−03 |
| 11 | −7.40403E−03 | 3.13180E−02 | −9.84398E−03 | 1.02790E−03 |

TABLE 5

Example 3
f = 3.23, Bf = 0.82

| Si | Ri | Di | Ndj | νdj |
|---|---|---|---|---|
| 1 (aperture stop) | ∞ | −0.099 | | |
| *2 | 1.60469 | 0.323 | 1.54488 | 54.87 |
| *3 | 4.86848 | 0.288 | | |
| *4 | 19.00971 | 0.300 | 1.63351 | 23.63 |
| *5 | 3.43603 | 0.150 | | |
| *6 | 2.22708 | 0.341 | 1.53391 | 55.89 |
| *7 | 2.12722 | 0.196 | | |
| *8 | 4.56927 | 0.442 | 1.54488 | 54.87 |
| *9 | −2.32833 | 0.709 | | |
| *10 | 1.98684 | 0.457 | 1.53391 | 55.89 |
| *11 | 0.88863 | 0.600 | | |
| 12 | ∞ | 0.110 | 1.51633 | 64.14 |
| 13 | ∞ | 0.145 | | |
| 14 (imaging plane) | ∞ | | | |

*aspherical surface

TABLE 7

Example 4
f = 2.75, Bf = 0.78

| Si | Ri | Di | Ndj | νdj |
|---|---|---|---|---|
| *1 | 1.48323 | 0.411 | 1.53391 | 55.89 |
| *2 | 8.41288 | 0.047 | | |
| 3 (aperture stop) | ∞ | 0.322 | | |
| *4 | −10.89592 | 0.271 | 1.63351 | 23.63 |
| *5 | 5.00904 | 0.120 | | |
| *6 | 9.67335 | 0.308 | 1.53391 | 55.89 |
| *7 | −3.99509 | 0.294 | | |
| *8 | 5.36219 | 0.593 | 1.54488 | 54.87 |
| *9 | −0.89079 | 0.120 | | |
| *10 | −2.66338 | 0.283 | 1.53391 | 55.89 |
| *11 | 0.76665 | 0.500 | | |
| 12 | ∞ | 0.110 | 1.51633 | 64.14 |
| 13 | ∞ | 0.213 | | |
| 14 (imaging plane) | ∞ | | | |

*aspherical surface

TABLE 6

Example 3: Aspherical Surface Data

| Surface Number | KA | A3 | A4 | A5 | A6 |
|---|---|---|---|---|---|
| 2 | 8.05206E−01 | −2.32940E−02 | 1.99905E−01 | −1.02452E+00 | 2.91865E+00 |
| 3 | 2.13278E+01 | −2.52638E−03 | −7.38517E−02 | −5.90168E−02 | −1.92200E−01 |
| 4 | 1.00000E+00 | 5.76429E−02 | −9.97840E−01 | 4.42409E+00 | −1.33623E+01 |
| 5 | −2.36126E+01 | 8.76741E−02 | −1.08614E+00 | 3.45790E+00 | −7.01430E+00 |
| 6 | −1.50455E+01 | −1.83120E−02 | −2.99068E−01 | −1.87789E−01 | 2.60819E+00 |
| 7 | 1.00000E+00 | −1.76029E−01 | 4.36336E−01 | −2.99782E+00 | 7.53748E+00 |
| 8 | 8.04382E+00 | −1.35165E−02 | −3.93822E−01 | 9.13790E−01 | −1.76002E+00 |
| 9 | −5.25878E+00 | −2.67665E−02 | −8.47478E−02 | −2.85731E−01 | 1.14541E+00 |
| 10 | −2.08434E+00 | 5.01469E−02 | −8.96038E−01 | 6.53182E−01 | −4.65284E−02 |
| 11 | −3.47845E+00 | 7.56272E−02 | −5.06691E−01 | 5.00121E−01 | −1.96608E−01 |

| | A7 | A8 | A9 | A10 |
|---|---|---|---|---|
| 2 | −4.91667E+00 | 4.32149E+00 | −1.39594E+00 | −3.22121E−01 |
| 3 | 7.31501E−01 | −1.12933E+00 | 5.08727E−01 | −9.54592E−02 |
| 4 | 2.31639E+01 | −2.23552E+01 | 1.03554E+01 | −1.35020E+00 |
| 5 | 9.04765E+00 | −7.39621E+00 | 3.71026E+00 | −8.61797E−01 |
| 6 | −5.46112E+00 | 5.01006E+00 | −1.91640E+00 | 1.71420E−01 |
| 7 | −1.02299E+01 | 7.91017E+00 | −3.46430E+00 | 7.05603E−01 |
| 8 | 2.32915E+00 | −1.71437E+00 | 4.97132E−01 | −7.93176E−03 |
| 9 | −1.79052E+00 | 1.59889E+00 | −7.24908E−01 | 1.25470E−01 |
| 10 | −1.47829E−01 | 1.03363E−01 | −3.36665E−02 | 4.29159E−03 |
| 11 | −4.21154E−03 | 3.12887E−02 | −1.04128E−02 | 1.12898E−03 |

TABLE 8

Example 4: Aspherical Surface Data

| Surface Number | KA | A3 | A4 | A5 | A6 |
|---|---|---|---|---|---|
| 1 | 8.61097E−01 | −1.05777E−02 | 2.52009E−01 | −2.16091E+00 | 7.92403E+00 |
| 2 | 1.17329E+01 | −3.54503E−02 | 1.50101E−01 | −7.02343E−01 | 1.52636E−01 |
| 4 | −3.40211E+03 | 8.81071E−02 | −1.92580E+00 | 9.19615E+00 | −3.40582E+01 |
| 5 | 1.84265E+01 | 2.78844E−01 | −2.48882E+00 | 9.93629E+00 | −2.91229E+01 |
| 6 | −4.78087E−01 | 1.11780E−01 | −3.75516E−01 | −8.46410E−01 | 4.38478E+00 |
| 7 | 1.39345E−01 | −7.97098E−02 | 1.05737E+00 | −8.04700E+00 | 2.37697E+01 |
| 8 | 7.96067E−01 | 2.53605E−01 | −1.08437E−00 | 1.78553E+00 | −2.39667E+00 |
| 9 | −4.56924E−02 | 2.53076E−01 | 7.85064E−02 | −1.72150E−01 | 8.91374E−01 |
| 10 | −5.08632E+00 | −2.05176E−02 | −1.34706E+00 | 2.25563E+00 | −7.29013E−01 |
| 11 | −9.29591E+00 | 1.35304E−01 | −9.12983E−01 | 1.30018E+00 | −6.75366E−01 |

| | A7 | A8 | A9 | A10 |
|---|---|---|---|---|
| 1 | −1.53506E+01 | 1.45834E+01 | −4.89169E−00 | −9.59363E−01 |
| 2 | 1.95309E+00 | −2.72167E+00 | −8.86617E−01 | 2.02142E+00 |
| 4 | 7.81637E+01 | −1.05838E+02 | 7.41710E+01 | −1.97418E+01 |
| 5 | 5.50409E+01 | −6.26947E+01 | 3.80410E+01 | −9.28963E+00 |
| 6 | −8.25165E+00 | 9.11391E+00 | −5.85714E+00 | 1.56137E+00 |
| 7 | −4.09356E+01 | 4.13319E+01 | −2.19787E+01 | 4.70588E+00 |
| 8 | 1.77010E+00 | −1.39786E+00 | 8.43334E−01 | −1.10370E−01 |
| 9 | −2.59984E+00 | 2.69484E+00 | −1.12144E+00 | 1.57836E−01 |
| 10 | −8.89709E−01 | 8.45592E−01 | −2.63899E−01 | 2.80941E−02 |
| 11 | −5.02196E−02 | 1.80810E−01 | −6.26665E−02 | 6.41094E−03 |

TABLE 9

Example 5
f = 2.72, Bf = 0.77

| Si | Ri | Di | Ndj | νdj |
|---|---|---|---|---|
| *1 | 1.41157 | 0.409 | 1.53391 | 55.89 |
| *2 | 7.83316 | 0.047 | | |
| 3 (aperture stop) | ∞ | 0.302 | | |
| *4 | −9.63921 | 0.295 | 1.63351 | 23.63 |
| *5 | 5.35683 | 0.115 | | |
| *6 | 2.26814 | 0.213 | 1.53391 | 55.89 |
| *7 | 3.21544 | 0.223 | | |
| *8 | 6.20415 | 0.602 | 1.54488 | 54.87 |
| *9 | −0.78285 | 0.112 | | |
| *10 | −2.66338 | 0.417 | 1.53391 | 55.89 |
| *11 | 0.80756 | 0.470 | | |
| 12 | ∞ | 0.110 | 1.51633 | 64.14 |
| 13 | ∞ | 0.229 | | |
| 14 (imaging plane) | ∞ | | | |

*aspherical surface

TABLE 10

Example 5: Aspherical Surface Data

| Surface Number | KA | A3 | A4 | A5 | A6 |
|---|---|---|---|---|---|
| 1 | 8.61464E−01 | −5.09509E−03 | 2.23507E−01 | −2.12393E+00 | 8.10613E+00 |
| 2 | 2.38095E+01 | −6.61534E−03 | −2.29125E−02 | −2.48891E−01 | −3.03516E−01 |
| 4 | −2.55408E+03 | 1.02185E−01 | −1.94069E+00 | 9.49459E+00 | −3.29760E+01 |
| 5 | 1.82734E+01 | 2.55975E−01 | −2.50561E+00 | 1.01713E+01 | −2.92406E+01 |
| 6 | −3.51986E−01 | 1.50364E−01 | −1.20517E+00 | 4.79008E−01 | 4.04869E+00 |
| 7 | 4.32953E+00 | −1.49361E−02 | 3.22945E−01 | −6.90963E+00 | 2.33051E+01 |
| 8 | 6.77913E−01 | 1.72561E−01 | −8.41689E−01 | 1.36186E+00 | −2.04778E+00 |
| 9 | −2.16841E−01 | 8.93319E−02 | 1.24624E−01 | −5.98993E−02 | 8.83933E−01 |
| 10 | −6.01381E+00 | −2.16995E−03 | −1.36318E+00 | 2.19125E+00 | −7.40646E−01 |
| 11 | −6.46887E+00 | 9.70323E−02 | −9.20764E−01 | 1.33191E+00 | −6.98153E−01 |

| | A7 | A8 | A9 | A10 |
|---|---|---|---|---|
| 1 | −1.58666E+01 | 1.46380E+01 | −3.96423E+00 | −1.71535E+00 |
| 2 | 1.84348E+00 | −2.46424E+00 | −5.54259E−01 | 1.62019E+00 |

TABLE 10-continued

Example 5: Aspherical Surface Data

| | | | | |
|---|---|---|---|---|
| 4 | 7.67101E+01 | −1.03945E+02 | 7.41775E+01 | −2.05387E+01 |
| 5 | 5.48806E+01 | −6.26628E+01 | 3.84370E+01 | −9.50774E+00 |
| 6 | −9.55242E+00 | 9.51499E+00 | −3.99361E+00 | 1.95667E−01 |
| 7 | −4.16833E+01 | 4.15293E+01 | −2.14324E+01 | 4.46431E+00 |
| 8 | 1.96930E+00 | −1.72481E+00 | 4.81744E−01 | 3.04860E−01 |
| 9 | −2.62710E+00 | 2.68570E+00 | −1.12118E+00 | 1.67800E−01 |
| 10 | −8.70344E−01 | 8.65297E−01 | −2.57524E−01 | 1.94953E−02 |
| 11 | −5.32152E−02 | 1.85120E−01 | −6.10171E−02 | 5.52565E−03 |

TABLE 11

Example 6
$f = 3.21, Bf = 0.73$

| Si | Ri | Di | Ndj | vdj |
|---|---|---|---|---|
| *1 | 1.39903 | 0.369 | 1.53391 | 55.89 |
| *2 | 2.63154 | 0.060 | | |
| 3 (aperture stop) | ∞ | 0.204 | | |
| *4 | 4.19278 | 0.304 | 1.63351 | 23.63 |
| *5 | 2.28193 | 0.078 | | |
| *6 | 3.21358 | 0.535 | 1.53391 | 55.89 |
| *7 | −7.73601 | 0.324 | | |
| *8 | 16.92920 | 0.516 | 1.54488 | 54.87 |
| *9 | −2.06645 | 0.297 | | |
| *10 | −4.75578 | 0.587 | 1.53391 | 55.89 |
| *11 | 1.42605 | 0.535 | | |
| 12 | ∞ | 0.092 | 1.51633 | 64.14 |
| 13 | ∞ | 0.135 | | |
| 14 (imaging plane) | ∞ | | | |

*aspherical surface

TABLE 12

Example 6: Aspherical Surface Data

| Surface Number | KA | A3 | A4 | A5 | A6 |
|---|---|---|---|---|---|
| 1 | 9.71063E−01 | 6.03787E−03 | 1.42557E−02 | −6.13109E−01 | 2.67704E+00 |
| 2 | 6.10745E+00 | 1.32515E−02 | −1.65147E−01 | 1.50165E−01 | −5.70811E−01 |
| 4 | 3.90250E+00 | 1.01177E−01 | −1.31913E+00 | 5.59261E+00 | −1.66567E+01 |
| 5 | −1.77723E+01 | 1.33966E−01 | −1.29417E+00 | 5.31007E+00 | −1.30819E+01 |
| 6 | −6.85439E+00 | −2.77972E−02 | 2.93155E−02 | −9.48830E−01 | 3.98550E+00 |
| 7 | 3.62037E+01 | −1.03544E−01 | 6.79746E−01 | −3.46999E+00 | 8.29338E+00 |
| 8 | 6.04397E+00 | 4.54294E−02 | −3.80416E−01 | 7.27469E−01 | −1.46057E+00 |
| 9 | −4.14158E+00 | −1.86895E−03 | −3.49088E−02 | −3.06590E−01 | 1.07308E+00 |
| 10 | −2.95912E−02 | 6.06641E−02 | −6.33096E−01 | 5.44354E−01 | −3.03943E−02 |
| 11 | −6.00000E+00 | 6.36986E−02 | −4.01231E−01 | 4.42139E−01 | −1.88135E−01 |

| | A7 | A8 | A9 | A10 |
|---|---|---|---|---|
| 1 | −5.20194E+00 | 4.36229E+00 | −6.70385E−01 | −7.59787E−01 |
| 2 | 1.14517E+00 | −1.41840E+00 | 7.24098E−01 | −2.21301E−01 |
| 4 | 2.90027E+01 | −2.84159E+01 | 1.33878E+01 | −1.81540E+00 |
| 5 | 1.91766E+01 | −1.67309E+01 | 8.08876E+00 | −1.61224E+00 |
| 6 | −7.88187E+00 | 8.21960E+00 | −4.19196E+00 | 7.76091E−01 |
| 7 | −1.14870E+01 | 9.21496E+00 | −3.92526E+00 | 6.85804E−01 |
| 8 | 1.64737E+00 | −9.96182E−01 | 2.15621E−01 | 1.92204E−02 |
| 9 | −1.82181E+00 | 1.67182E+00 | −7.37675E−01 | 1.20452E−01 |
| 10 | −1.39059E−01 | 8.98514E−02 | −2.87036E−02 | 3.32668E−03 |
| 11 | −3.27926E−03 | 3.12722E−02 | −1.04113E−02 | 1.12645E−03 |

TABLE 13

Reference Example 7
f = 3.19, Bf = 0.49

| Si | Ri | Di | Ndj | vdj |
|---|---|---|---|---|
| 1 (aperture stop) | ∞ | −0.149 | | |
| *2 | 1.30115 | 0.357 | 1.54488 | 54.87 |
| *3 | 7.87363 | 0.060 | | |
| *4 | 15.44167 | 0.131 | 1.63351 | 23.63 |
| *5 | 2.87875 | 0.356 | | |
| *6 | 3.82754 | 0.372 | 1.54488 | 54.87 |
| *7 | 9.21746 | 0.431 | | |
| *8 | 7.53036 | 0.364 | 1.54488 | 54.87 |

TABLE 13-continued

Reference Example 7
f = 3.19, Bf = 0.49

| Si | Ri | Di | Ndj | vdj |
|---|---|---|---|---|
| *9 | −2.88888 | 0.615 | | |
| *10 | −1.65207 | 0.473 | 1.54488 | 54.87 |
| *11 | 5.52039 | 0.250 | | |
| 12 | ∞ | 0.145 | 1.51633 | 64.14 |
| 13 | ∞ | 0.146 | | |
| 14 (imaging plane) | ∞ | | | |

*aspherical surface

TABLE 14

Reference Example 7: Aspherical Surface Data

| Surface Number | K | A3 | A4 | A5 | A6 |
|---|---|---|---|---|---|
| 2 | −1.07092E+00 | −6.05401E−02 | −9.30682E−02 | 6.26776E+00 | −3.29290E+01 |
| 3 | −8.71299E+02 | −2.63560E−01 | 3.11628E+00 | −2.20862E+01 | 6.75541E+01 |
| 4 | −4.48964E+02 | −1.98647E−01 | 2.05204E+00 | −1.75838E+01 | 5.72188E+01 |
| 5 | −1.08603E+00 | −1.90736E−01 | 9.10400E−01 | −7.31092E+00 | −2.01180E+01 |
| 6 | 8.16896E+00 | −2.24926E−01 | 5.09265E−01 | 2.51724E−02 | −7.15019E+00 |
| 7 | −1.02989E+04 | 1.48152E−01 | −2.46165E−01 | −9.99562E−01 | 1.36586E+00 |
| 8 | −1.21522E+02 | 3.18323E−02 | −6.63496E−01 | 6.32959E+00 | −2.84746E+01 |
| 9 | −2.75958E+01 | −2.57148E−01 | 1.38858E+00 | −4.56997E+00 | 5.78216E+00 |
| 10 | 1.08232E+00 | 4.17627E−01 | −1.58275E+00 | 2.92673E+00 | −6.83378E+00 |
| 11 | 6.38772E+00 | 5.14863E−01 | −1.32210E+00 | 1.43609E+00 | −2.33351E+00 |

| | A7 | A8 | A9 | A10 | A11 |
|---|---|---|---|---|---|
| 2 | 2.45496E+01 | 2.94554E+02 | −8.56433E+02 | 1.29409E+02 | 2.12917E+03 |
| 3 | −5.06602E+01 | −1.88539E+02 | 2.34615E+02 | 9.13904E−02 | −2.23602E+03 |
| 4 | −5.53356E+01 | −6.90581E+01 | 6.23640E+01 | 3.77548E+02 | −5.07121E+02 |
| 5 | 9.58760E+01 | −1.19558E+02 | −1.60419E+02 | 5.83876E+02 | −6.52804E+02 |
| 6 | 1.21958E+01 | 1.95692E+01 | −5.78982E+01 | −1.46950E+01 | 1.05875E+02 |
| 7 | 1.61195E+00 | −3.63449E+00 | 9.16462E−01 | −2.68381E+00 | 6.94941E+00 |
| 8 | 5.68888E+01 | −3.63898E+01 | −4.70196E+01 | 7.84256E+01 | 4.38804E+00 |
| 9 | −1.51191E+00 | −1.28714E+00 | −4.84105E+00 | 7.94413E+00 | −2.12591E−02 |
| 10 | 1.05364E+01 | −5.43533E+00 | −5.68728E+00 | 8.62691E+00 | −1.29617E+00 |
| 11 | 3.21767E+00 | −1.50846E+00 | −1.08646E+00 | 1.46039E+00 | −3.83520E−01 |

| | A12 | A13 | A14 | A15 | A16 |
|---|---|---|---|---|---|
| 2 | −1.15100E+03 | −2.99901E+03 | 3.03703E+02 | 6.35460E+03 | −4.39230E+03 |
| 3 | 7.39555E+02 | 2.24625E+03 | −2.34285E+03 | 6.11274E+02 | 2.40877E+00 |
| 4 | −1.71058E+02 | 1.03608E+02 | 7.42223E+02 | −4.35509E+02 | −1.24694E+02 |
| 5 | 5.31534E+02 | −7.15452E+01 | −1.48610E+03 | 2.41532E+03 | −1.13995E+03 |
| 6 | 2.25944E+01 | −1.49213E+02 | −3.27057E+01 | 1.90165E+02 | −9.00142E+01 |
| 7 | 8.68112E−01 | −5.21861E+00 | −9.85480E+00 | 1.75600E+01 | −7.07915E+00 |
| 8 | −6.37275E+01 | 1.85004E+01 | 2.63727E+01 | −1.73553E+01 | 2.45972E+00 |
| 9 | −3.67031E+00 | −1.40194E+00 | 3.56092E+00 | −1.46930E+00 | 1.57529E−01 |
| 10 | −3.03590E+00 | 2.32950E−01 | 2.01118E+00 | −1.19600E+00 | 2.13214E−01 |
| 11 | −1.91607E−01 | 1.43436E−01 | −3.21338E−02 | 2.28417E−03 | 2.11147E−05 |

TABLE 15

Reference Example 8
f = 3.33, Bf = 0.40

| Si | Ri | Di | Ndj | vdj |
|---|---|---|---|---|
| 1 (aperture stop) | ∞ | −0.149 | | |
| *2 | 1.44626 | 0.430 | 1.54488 | 54.87 |
| *3 | 9.09917 | 0.062 | | |
| *4 | 10.50156 | 0.160 | 1.63351 | 23.63 |
| *5 | 3.18152 | 0.367 | | |
| *6 | 4.81323 | 0.309 | 1.54488 | 54.87 |
| *7 | 20.39618 | 0.391 | | |
| *8 | 107.79569 | 0.578 | 1.54488 | 54.87 |
| *9 | −2.42546 | 0.634 | | |

TABLE 15-continued

Reference Example 8
f = 3.33, Bf = 0.40

| Si | Ri | Di | Ndj | vdj |
|---|---|---|---|---|
| *10 | −1.65327 | 0.612 | 1.54488 | 54.87 |
| *11 | 6.84890 | 0.150 | | |
| 12 | ∞ | 0.145 | 1.51633 | 64.14 |
| 13 | ∞ | 0.156 | | |
| 14 (imaging plane) | ∞ | | | |

*aspherical surface

TABLE 16

Reference Example 8: Aspherical Surface Data

| Surface Number | K | A3 | A4 | A5 | A6 |
|---|---|---|---|---|---|
| 2 | −9.40997E−01 | −8.81017E−02 | 2.15880E−01 | 5.10344E+00 | −4.78642E+01 |
| 3 | −2.33467E+03 | −2.53200E−01 | 3.32268E+00 | −2.44761E+01 | 1.03414E+02 |
| 4 | −3.39298E+03 | −1.63795E−01 | 2.10354E+00 | −1.59846E+01 | 6.00963E+01 |
| 5 | 9.43045E−02 | 1.07554E−01 | −1.45344E+00 | 8.32648E+00 | −3.17066E+01 |
| 6 | 9.29015E+00 | 1.68270E−01 | −9.44711E−01 | 1.46948E−01 | 8.13773E+00 |
| 7 | 3.67326E+02 | 5.49083E−01 | −5.58939E+00 | 2.70361E+01 | −7.58354E+01 |
| 8 | 8.52385E+03 | 2.36498E−01 | −2.06007E+00 | 9.08512E+00 | −2.41200E+01 |
| 9 | −1.82308E+01 | −2.80269E−01 | 1.18996E+00 | −3.27287E+00 | 3.95693E+00 |
| 10 | 8.63085E−01 | 3.02121E−01 | −1.08574E+00 | 8.06218E−01 | 9.11080E−01 |
| 11 | 7.45503E+00 | 7.07339E−01 | −2.39664E+00 | 3.92092E+00 | −4.02400E+00 |

| | A7 | A8 | A9 | A10 | A11 |
|---|---|---|---|---|---|
| 2 | 2.01713E+02 | −4.78975E+02 | 6.81175E+02 | −7.38152E+02 | 1.27084E+03 |
| 3 | −2.74990E+02 | 4.37917E+02 | −3.28475E+02 | −8.24159E+00 | −4.88241E+01 |
| 4 | −1.29109E+02 | 1.65326E+02 | −1.58836E+02 | 3.17996E+02 | −6.77327E+02 |
| 5 | 7.51300E+01 | −9.47717E+01 | 6.34434E+01 | −6.78425E+01 | 1.00562E+02 |
| 6 | −2.65212E+01 | 3.42236E+01 | −6.98426E+00 | −3.11075E+01 | 3.76649E+01 |
| 7 | 1.13708E+02 | −6.71109E+01 | −2.48665E+00 | −1.03740E+02 | 3.02710E+02 |
| 8 | 3.38552E+01 | −1.47423E+01 | −1.87561E+01 | 1.38743E+01 | 2.08066E+01 |
| 9 | −1.47711E+00 | −7.38248E−01 | 6.97334E−02 | 2.59104E−01 | 6.50596E−01 |
| 10 | −1.82384E+00 | 6.29994E−01 | 1.46443E−01 | 6.48103E−01 | −8.06905E−01 |
| 11 | 2.54401E+00 | −8.13902E−01 | −2.04465E−02 | 7.98330E−02 | 1.47092E−02 |

| | A12 | A13 | A14 | A15 | A16 |
|---|---|---|---|---|---|
| 2 | −2.65405E+03 | 3.53090E+03 | −2.56044E+03 | 8.78743E+02 | −8.85094E+01 |
| 3 | 6.09161E+02 | −7.16039E+02 | 1.09272E+02 | 2.55483E+02 | −1.17518E+02 |
| 4 | 4.55783E+02 | 8.32175E+02 | −1.84652E+03 | 1.35931E+03 | −3.64929E+02 |
| 5 | 4.81186E+01 | −2.96524E+02 | 2.86922E+02 | −8.98052E+01 | −4.38958E−01 |
| 6 | −1.71480E+01 | −1.46146E+01 | 4.38797E+01 | −3.95384E+01 | 1.24043E+01 |
| 7 | −2.08672E+02 | −1.51829E+02 | 3.11798E+02 | −1.75363E+02 | 3.45475E+01 |
| 8 | −1.59062E+00 | −2.43986E+01 | 3.62527E+01 | −1.70035E+01 | 2.73755E+00 |
| 9 | −2.16192E−01 | −7.67543E−01 | 6.78478E−01 | −2.03553E−01 | 2.00769E−02 |
| 10 | −1.13981E−02 | 4.24796E−01 | −2.71714E−01 | 7.79054E−02 | −9.38427E−03 |
| 11 | −2.26058E−02 | 2.58484E−03 | 2.41889E−03 | −8.65527E−04 | 8.71412E−05 |

TABLE 17

Example 9
f = 3.19, Bf = 0.76

| Si | Ri | Di | Ndj | νdj |
|---|---|---|---|---|
| *1 | 1.47289 | 0.387 | 1.53391 | 55.89 |
| *2 | 2.66051 | 0.060 | | |
| 3 (aperture stop) | ∞ | 0.189 | | |
| *4 | 6.35692 | 0.339 | 1.63351 | 23.63 |
| *5 | 2.91879 | 0.121 | | |
| *6 | 3.63074 | 0.540 | 1.53391 | 55.89 |
| *7 | −7.89233 | 0.262 | | |
| *8 | 2.06359 | 0.304 | 1.54488 | 54.87 |
| *9 | 4.66118 | 0.568 | | |
| *10 | 2.94594 | 0.458 | 1.53391 | 55.89 |
| *11 | 1.08638 | 0.581 | | |
| 12 | ∞ | 0.092 | 1.51633 | 64.14 |
| 13 | ∞ | 0.116 | | |
| 14 (imaging plane) | ∞ | | | |

*aspherical surface

TABLE 18

Example 9: Aspherical Surface Data

| Surface Number | K | A3 | A4 | A5 | A6 |
|---|---|---|---|---|---|
| 1 | 1.88802E+00 | 2.87287E−02 | −1.44789E−01 | −3.78210E−01 | 2.86069E+00 |
| 2 | 7.59595E+00 | 2.81425E−03 | −1.05765E−01 | −1.81132E−01 | 3.42041E−01 |
| 4 | 5.00000E+00 | 6.47820E−02 | −1.06524E+00 | 4.69633E+00 | −1.49860E+01 |
| 5 | −1.78043E+01 | 1.37174E−01 | −1.32790E+00 | 5.02802E+00 | −1.23109E+01 |
| 6 | −7.93125E+00 | −3.90978E−02 | 1.66571E+00 | −1.45090E+00 | 4.82216E+00 |
| 7 | 4.18777E+01 | −1.20746E−01 | 6.04293E−01 | −3.46910E+00 | 8.39432E+00 |
| 8 | 1.51484E+00 | 2.87768E−02 | −4.34143E−01 | 6.31130E−01 | −1.01571E+00 |
| 9 | −7.18541E+00 | −6.21545E−03 | −1.76532E−02 | −1.50386E−01 | 9.19259E−01 |
| 10 | −3.95064E+00 | 6.90835E−02 | −7.80850E−01 | 5.58526E−01 | −3.97998E−03 |
| 11 | −4.28187E+00 | 1.07934E−01 | −5.27088E−01 | 5.13970E−01 | −1.93343E−01 |

TABLE 18-continued

Example 9: Aspherical Surface Data

|   | A7 | A8 | A9 | A10 |
|---|---|---|---|---|
| 1  | −7.02226E+00 | 7.83791E+00  | −3.71202E+00 | 2.89385E−01  |
| 2  | −4.81392E−01 | 2.94230E−01  | −2.21937E−01 | −3.31229E−02 |
| 4  | 2.77662E+01  | −2.92119E+01 | 1.54888E+01  | −2.92267E+00 |
| 5  | 1.87154E+01  | −1.74889E+01 | 9.39371E+00  | −2.19979E+00 |
| 6  | −8.46906E+00 | 8.09308E+00  | −3.86008E+00 | 6.94611E−01  |
| 7  | −1.14784E+01 | 9.19811E+00  | −4.04141E+00 | 7.70494E−01  |
| 8  | 1.24149E+00  | −1.26718E+00 | 7.41117E−01  | −1.72176E−01 |
| 9  | −1.91408E+00 | 1.71330E+00  | −6.92618E−01 | 1.04021E−01  |
| 10 | −1.35326E−01 | 8.46161E−02  | −3.11372E−02 | 4.99242E−03  |
| 11 | −8.53450E−03 | 3.13255E−02  | −9.79160E−03 | 1.03286E−03  |

TABLE 19

Reference Example 10
f = 3.28, Bf = 0.59

| Si | Ri | Di | Ndj | νdj |
|---|---|---|---|---|
| 1 (aperture stop) | ∞ | −0.099 | | |
| *2  | 1.60742   | 0.332 | 1.54488 | 54.87 |
| *3  | 5.14112   | 0.287 | | |
| *4  | 48.43087  | 0.326 | 1.63351 | 23.63 |
| *5  | 3.56748   | 0.134 | | |
| *6  | 2.07948   | 0.329 | 1.53391 | 55.89 |
| *7  | 2.42852   | 0.261 | | |
| *8  | 6.25993   | 0.508 | 1.54488 | 54.87 |
| *9  | −1.82654  | 0.905 | | |
| *10 | −2.32823  | 0.353 | 1.53391 | 55.89 |
| *11 | 3.04319   | 0.380 | | |
| 12  | ∞         | 0.110 | 1.51633 | 64.14 |
| 13  | ∞         | 0.139 | | |
| 14 (imaging plane) | ∞ | | | |

*aspherical surface

TABLE 21

Example 11
f = 3.37, Bf = 0.95

| Si | Ri | Di | Ndj | νdj |
|---|---|---|---|---|
| 1 (aperture stop) | ∞ | −0.099 | | |
| *2  | 1.47495  | 0.304 | 1.54488 | 54.87 |
| *3  | 4.67568  | 0.281 | | |
| *4  | 50.64056 | 0.251 | 1.63351 | 23.63 |
| *5  | 4.15412  | 0.221 | | |
| *6  | 2.72195  | 0.425 | 1.53391 | 55.89 |
| *7  | 2.64394  | 0.228 | | |
| *8  | 1.88715  | 0.232 | 1.54488 | 54.87 |
| *9  | 3.41556  | 0.453 | | |
| *10 | 1.32287  | 0.715 | 1.53391 | 55.89 |
| *11 | 0.96345  | 0.686 | | |
| 12  | ∞        | 0.110 | 1.51633 | 64.14 |
| 13  | ∞        | 0.186 | | |
| 14 (imaging plane) | ∞ | | | |

*aspherical surface

TABLE 20

Reference Example 10: Aspherical Surface Data

| Surface Number | K | A3 | A4 | A5 | A6 |
|---|---|---|---|---|---|
| 2  | 7.87172E−01  | −1.97200E−02 | 1.74886E−01  | −9.23747E−01 | 2.70682E+00  |
| 3  | 2.10132E+01  | −4.83421E−03 | −6.53693E−02 | −4.28517E−02 | −2.57307E−01 |
| 4  | 4.00001E+00  | 5.95351E−02  | −9.51243E−01 | 4.35784E+00  | −1.32903E+01 |
| 5  | −2.30298E+01 | 8.05309E−02  | −1.08441E+00 | 3.53342E+00  | −7.15600E+00 |
| 6  | −1.53648E+01 | −1.48095E−02 | −3.18308E−01 | −1.11446E+00 | 2.59091E+00  |
| 7  | 9.31160E−01  | −1.46539E−01 | 3.75590E−01  | −2.93450E+00 | 7.59209E+00  |
| 8  | 7.66975E+00  | 1.64535E−02  | −4.05098E−01 | 8.24739E−01  | −1.65939E+00 |
| 9  | −5.65030E+00 | 2.69419E−02  | −1.56533E−01 | −2.69217E−01 | 1.12715E+00  |
| 10 | −2.88324E+00 | 1.91997E−01  | −7.49731E−01 | 5.92096E−01  | −6.85233E−02 |
| 11 | −6.00000E+00 | 1.61954E−01  | −5.83937E−01 | 5.42837E−01  | −2.04071E−01 |

|   | A7 | A8 | A9 | A10 |
|---|---|---|---|---|
| 2  | −4.82987E+00 | 4.76477E+00  | −2.17217E+00 | 7.38940E−02  |
| 3  | 7.97305E−01  | −1.05394E+00 | 3.04954E−01  | 3.44287E−02  |
| 4  | 2.31812E+01  | −2.24636E+01 | 1.04903E+01  | −1.43772E+00 |
| 5  | 9.17960E+00  | −7.41635E+00 | 3.66355E+00  | −8.46426E−01 |
| 6  | −5.56902E+00 | 4.98651E+00  | −1.74233E+00 | 8.80063E−02  |
| 7  | −1.03648E+01 | 7.92363E+00  | −3.34864E+00 | 6.39841E−01  |
| 8  | 2.23806E+00  | −1.63167E+00 | 5.05842E−01  | −4.41133E−02 |
| 9  | −1.79314E+00 | 1.60756E+00  | −7.20757E−01 | 1.22997E−01  |
| 10 | −1.45969E−01 | 1.06027E−01  | −3.28986E−02 | 3.99307E−03  |
| 11 | −7.13147E−03 | 3.16763E−02  | −1.00401E−02 | 1.06901E−03  |

TABLE 22

Example 11: Aspherical Surface Data

| Surface Number | K | A3 | A4 | A5 | A6 |
|---|---|---|---|---|---|
| 2 | 8.96535E−01 | −9.88641E−03 | 1.11609E−01 | −7.50053E−01 | 2.50501E+00 |
| 3 | 2.11757E+01 | 9.52956E−03 | −1.54771E−01 | 1.27964E−01 | −3.57145E−01 |
| 4 | −1.18248E+02 | 6.80263E−02 | −1.19389E+00 | 4.79130E+00 | −1.36167E+01 |
| 5 | −2.33915E+01 | 1.44684E−01 | −1.42633E+00 | 4.09397E+00 | −7.78151E+00 |
| 6 | −1.55828E+01 | 4.69063E−02 | −3.89385E−01 | −7.78566E−02 | 2.57858E+00 |
| 7 | 1.10695E+00 | −2.30069E−01 | 7.27444E−01 | −3.42312E+00 | 7.94825E+00 |
| 8 | 2.30082E+00 | −3.39687E−01 | −3.05930E−01 | 7.97371E−01 | −1.67446E+00 |
| 9 | −5.29345E+00 | −3.76088E−01 | −2.68967E−01 | 2.65203E−02 | 1.22084E+00 |
| 10 | −2.30396E+00 | 4.35783E−04 | −8.39171E−01 | 6.63581E−01 | −5.24603E−02 |
| 11 | −2.16101E+00 | 1.20334E−03 | −4.44489E−01 | 4.91711E−01 | −1.99449E−01 |

| Surface Number | A7 | A8 | A9 | A10 |
|---|---|---|---|---|
| 2 | −4.49147E+00 | 3.56952E+00 | −1.68512E−01 | −1.08434E+00 |
| 3 | 7.43929E−01 | −1.38740E+00 | 1.35012E+00 | −6.85576E−01 |
| 4 | 2.30965E+01 | −2.23672E+01 | 1.14086E+01 | −2.18276E+00 |
| 5 | 9.48406E+00 | −7.19698E+00 | 3.71669E+00 | −1.02447E+00 |
| 6 | −5.68732E+00 | 4.97355E+00 | −1.45745E+00 | −7.70742E−02 |
| 7 | −1.03820E+01 | 7.80246E+00 | −3.42859E+00 | 7.32922E−01 |
| 8 | 2.55087E+00 | −1.77538E+00 | 1.88450E−01 | 1.37227E−01 |
| 9 | −1.88887E+00 | 1.54781E+00 | −6.95259E−01 | 1.28082E−01 |
| 10 | −1.50354E−01 | 1.01801E−01 | −3.38581E−02 | 4.74833E−03 |
| 11 | −5.15052E−03 | 3.15914E−02 | −1.02985E−02 | 1.10339E−03 |

TABLE 23

Values Related to Conditional Formulae

| Formula | Conditional Expression | Example 1 | Example 2 | Example 3 | Example 4 | Example 5 | Example 6 |
|---|---|---|---|---|---|---|---|
| 1 | f/f2 | −0.441 | −0.378 | −0.483 | −0.511 | −0.504 | −0.381 |
| 2 | f/f1 | 0.830 | 0.624 | 0.760 | 0.832 | 0.862 | 0.633 |
| 3 | (R1f − R1r)/(R1f + R1r) | −0.597 | −0.302 | −0.504 | −0.700 | −0.695 | −0.306 |
| 4 | f/f3 | 0.074 | 0.601 | 0.007 | 0.515 | 0.203 | 0.742 |
| 5 | f/f4 | 0.897 | 0.728 | 1.113 | 1.896 | 2.066 | 0.940 |
| 6 | f/f5 | −0.750 | −1.154 | −0.916 | −2.537 | −2.440 | −1.613 |
| 7 | f/f34 | 0.924 | 1.234 | 1.060 | 2.164 | 2.112 | 1.492 |
| 8 | f/f12 | 0.503 | 0.329 | 0.369 | 0.445 | 0.483 | 0.340 |
| 9 | D9/f | 0.044 | 0.146 | 0.220 | 0.044 | 0.041 | 0.093 |

| Formula | Conditional Expression | Reference Example 7 | Reference Example 8 | Example 9 | Reference Example 10 | Example 11 |
|---|---|---|---|---|---|---|
| 1 | f/f2 | −0.569 | −0.459 | −0.360 | −0.537 | −0.470 |
| 2 | f/f1 | 1.137 | 1.078 | 0.575 | 0.788 | 0.880 |
| 3 | (R1f − R1r)/(R1f + R1r) | −0.716 | −0.726 | −0.287 | −0.524 | −0.520 |
| 4 | f/f3 | 0.272 | 0.290 | 0.674 | 0.161 | 0.017 |
| 5 | f/f4 | 0.822 | 0.765 | 0.489 | 1.234 | 0.458 |
| 6 | f/f5 | −1.399 | −1.399 | −0.905 | −1.356 | −0.156 |
| 7 | f/f34 | 1.024 | 1.024 | 0.987 | 1.127 | 1.295 |
| 8 | f/f12 | 0.655 | 0.655 | 0.697 | 0.290 | 0.355 |
| 9 | D9/f | 0.193 | 0.190 | 0.178 | 0.276 | 0.135 |

What is claimed is:

1. An imaging lens substantially consisting of five lenses, including:
a first lens having a positive refractive power and is of a meniscus shape with a convex surface toward the object side;
a second lens having a negative refractive power;
a third lens having a positive refractive power and a convex surface toward the object side;
a fourth lens having a positive refractive power and a convex surface toward the object side; and
a fifth lens having a negative refractive power, a concave surface toward the image side on the surface thereof toward the image side in the vicinity of the optical axis, and an inflection point on the surface thereof toward the image side, provided in this order from the object side;
the imaging lens satisfying the following conditional formula:

$$0.34 < f/f12 < 0.6 \tag{8-2}$$

wherein f is the focal length of the entire system, and f12 is the combined focal length of the first lens and the second lens.

2. An imaging lens as defined in claim 1 that further satisfies the following conditional formula:

$$0.8 < f/f34 < 2.5 \tag{7}$$

wherein f is the focal length of the entire system, and f34 is the combined focal length of the third lens and the fourth lens.

3. An imaging lens as defined in claim 1 that satisfies the following conditional formula:

$$0.1 < D9/f < 0.5 \quad (9)$$

wherein D9 is the distance between the fourth lens and the fifth lens along the optical axis, and f is the focal length of the entire system.

4. An imaging lens as defined in claim 1 that further satisfies the following conditional formula:

$$-0.8 < f/f2 < -0.1 \quad (1)$$

wherein f is the focal length of the entire system, and f2 is the focal length of the second lens.

5. An imaging lens as defined in claim 1 that satisfies the following conditional formula:

$$0.3 < f/f1 < 1.4 \quad (2)$$

wherein f is the focal length of the entire system, and f1 is the focal length of the first lens.

6. An imaging lens as defined in claim 1 that further satisfies the following conditional formula:

$$-1 < (R1f - R1r)/(R1f + R1r) < -0.15 \quad (3)$$

wherein R1f is the paraxial radius of curvature of the surface of the first lens toward the object side, and R1r is the paraxial radius of curvature of the surface of the first lens toward the image side.

7. An imaging lens as defined in claim 1 that further satisfies the following conditional formula:

$$0 < f/f3 < 1 \quad (4)$$

wherein f is the focal length of the entire system, and f3 is the focal length of the third lens.

8. An imaging lens as defined in claim 1 that further satisfies the following conditional formula:

$$0.8 < f/f4 < 2.4 \quad (5-2)$$

wherein f is the focal length of the entire system, and f4 is the focal length of the fourth lens.

9. An imaging lens as defined in claim 1 that further satisfies the following conditional formula:

$$-5 < f/f5 < 0 \quad (6)$$

wherein f is the focal length of the entire system, and f5 is the focal length of the fifth lens.

10. An imaging lens as defined in claim 1, wherein an aperture stop is positioned at the object side of the surface of the second lens toward the object side.

11. An imaging lens as defined in claim 1 that further satisfies the following conditional formula:

$$0.86 < f/f34 < 2.4 \quad (7-1)$$

wherein f is the focal length of the entire system, and f34 is the combined focal length of the third lens and the fourth lens.

12. An imaging lens as defined in claim 11 that further satisfies the following conditional formula:

$$0.9 < f/f34 < 2.2 \quad (7-2).$$

13. An imaging lens as defined in claim 1 that satisfies the following conditional formula:

$$0.12 < D9/f < 0.3 \quad (9-1)$$

wherein D9 is the distance between the fourth lens and the fifth lens along the optical axis, and f is the focal length of the entire system.

14. An imaging lens as defined in claim 1 that further satisfies the following conditional formula:

$$0.34 f/f12 < 0.56 \quad (8-3).$$

15. An imaging apparatus equipped with the imaging lens as defined in claim 1.

16. An imaging lens substantially consisting of five lenses, including:
a first lens having a positive refractive power and is of a meniscus shape with a convex surface toward the object side;
a second lens having a negative refractive power;
a third lens having a biconvex shape;
a fourth lens having a positive refractive power and a convex surface toward the object side; and
a fifth lens having a negative refractive power, a concave surface toward the image side on the surface thereof toward the image side in the vicinity of the optical axis, and an inflection point on the surface thereof toward the image side, provided in this order from the object side;
the imaging lens satisfying the following conditional formula:

$$-0.8 < f/f2 < -0.1 \quad (1)$$

wherein f is the focal length of the entire system, and f2 is the combined focal length of the second lens.

17. An imaging lens as defined in claim 16 that further satisfies the following conditional formula:

$$0.25 < f/f12 < 0.6 \quad (8)$$

wherein f is the focal length of the entire system, and f12 is the combined focal length of the first lens and the second lens.

18. An imaging lens as defined in claim 16 that further satisfies the following conditional formula:

$$0.25 < f/f12 < 0.56 \quad (8-1)$$

wherein f is the focal length of the entire system, and f12 is the combined focal length of the first lens and the second lens.

19. An imaging lens as defined in claim 16 that further satisfies the following conditional formula:

$$0.8 < f/f34 < 2.5 \quad (7)$$

wherein f is the focal length of the entire system, and f34 is the combined focal length of the third lens and the fourth lens.

20. An imaging apparatus equipped with the imaging lens as defined in claim 16.

* * * * *